(12) United States Patent
Noh et al.

(10) Patent No.: US 10,990,139 B2
(45) Date of Patent: Apr. 27, 2021

(54) DISPLAY DEVICE

(71) Applicant: Samsung Display Co., Ltd., Yongin-si (KR)

(72) Inventors: Jung Hun Noh, Yongin-si (KR); Yi Joon Ahn, Seoul (KR); Myung Im Kim, Yongin-si (KR); Keun Kyu Song, Seongnam-si (KR); Jae Woo Im, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/204,585

(22) Filed: Nov. 29, 2018

(65) Prior Publication Data
US 2019/0227603 A1    Jul. 25, 2019

(30) Foreign Application Priority Data

Jan. 23, 2018   (KR) .................. 10-2018-0008077

(51) Int. Cl.
*G06F 1/16* (2006.01)
*H04R 1/28* (2006.01)
*H04R 1/02* (2006.01)
*H04R 7/10* (2006.01)
*H04R 17/00* (2006.01)

(52) U.S. Cl.
CPC .......... *G06F 1/1688* (2013.01); *G06F 1/1605* (2013.01); *G06F 1/1626* (2013.01); *H04R 1/025* (2013.01); *H04R 1/2811* (2013.01); *H04R 7/10* (2013.01); *H04R 17/00* (2013.01); *H04R 17/005* (2013.01); *H04R 2499/11* (2013.01); *H04R 2499/15* (2013.01)

(58) Field of Classification Search
CPC .... G06F 1/1603; G06F 1/1688; G06F 1/1605; G06F 1/1607; G06F 1/1626; G06F 1/025; H04R 2499/15; H04R 7/045; H04R 1/2811
See application file for complete search history.

(56) References Cited

U.S. PATENT DOCUMENTS

| | | | |
|---|---|---|---|
| 3,587,564 | A | 6/1971 | Hagan et al. |
| 6,198,502 | B1 | 3/2001 | Watkins |
| 8,040,455 | B2 | 10/2011 | Won et al. |

(Continued)

FOREIGN PATENT DOCUMENTS

| | | | |
|---|---|---|---|
| JP | 2010085453 | | 4/2010 |
| JP | 2014164430 | A * | 9/2014 |

*Primary Examiner* — Fan S Tsang
*Assistant Examiner* — Angelica M McKinney
(74) *Attorney, Agent, or Firm* — Cantor Colburn LLP

(57) ABSTRACT

A display device includes a display panel, a vibration sound device disposed below the display panel, a lower panel sheet disposed adjacent to the vibration sound device below the display panel and including a functional layer and a bottom coupling layer disposed on a lower surface of the functional layer, and a bracket disposed below the vibration sound device and the lower panel sheet and coupled with the bottom coupling layer, wherein the bottom coupling layer partially exposes the lower surface of the functional layer, a separation space is defined between the bracket and the lower surface of the functional layer where the bottom coupling layer is exposed, and the separation space is partially connected with the vibration sound device.

27 Claims, 25 Drawing Sheets

(56) References Cited

U.S. PATENT DOCUMENTS

| | | | |
|---|---|---|---|
| 8,947,616 B2 | 2/2015 | Tang et al. | |
| 9,420,363 B2 | 8/2016 | Seo et al. | |
| 9,621,692 B2* | 4/2017 | Lee | H04M 1/0266 |
| 10,437,284 B2* | 10/2019 | Kwak | G06F 1/1637 |
| 10,802,635 B2* | 10/2020 | Jung | G06F 1/1688 |
| 2006/0140439 A1* | 6/2006 | Nakagawa | H04M 1/0266 |
| | | | 381/431 |
| 2006/0227981 A1* | 10/2006 | Miyata | H04R 7/04 |
| | | | 381/124 |
| 2006/0270459 A1* | 11/2006 | Lee | H04M 1/03 |
| | | | 455/565 |
| 2012/0104559 A1* | 5/2012 | Kim | H01L 23/585 |
| | | | 257/618 |
| 2012/0281381 A1* | 11/2012 | Sanford | G06F 1/1626 |
| | | | 361/807 |
| 2015/0177790 A1* | 6/2015 | Uto | G06F 1/1605 |
| | | | 381/190 |
| 2015/0304745 A1* | 10/2015 | Fromel | H04R 17/00 |
| | | | 381/162 |
| 2016/0050472 A1* | 2/2016 | Lee | H04R 1/028 |
| | | | 381/333 |
| 2016/0157370 A1* | 6/2016 | Kanemaki | H04R 7/045 |
| | | | 361/679.01 |
| 2016/0328065 A1* | 11/2016 | Johnson | G06F 3/03545 |
| 2017/0013334 A1* | 1/2017 | Hidaka | H04M 1/03 |
| 2017/0179423 A1* | 6/2017 | Kwon | H01L 51/5237 |
| 2017/0300736 A1* | 10/2017 | Song | G06K 9/0004 |
| 2019/0004030 A1* | 1/2019 | Yanagi | B81C 1/00158 |
| 2019/0292415 A1* | 9/2019 | Sato | C09J 5/00 |
| 2020/0020759 A1* | 1/2020 | Song | G06F 3/041 |

* cited by examiner

DISPLAY DEVICE

This application claims priority to Korean Patent Application No. 10-2018-0008077 filed on Jan. 23, 2018, and all the benefits accruing therefrom under 35 U.S.C. § 119, the content of which in its entirety is herein incorporated by reference.

BACKGROUND

1. Field

Exemplary embodiments of the invention relate to a display device, and more particularly, to a display device including a panel speaker function.

2. Description of the Related Art

Electronic devices such as smart phones, digital cameras, notebook computers, navigation systems, and televisions that provide images to users include a display device for displaying the images. The display device generally includes a display panel for generating and displaying the images and a lower panel sheet disposed below the display panel. The lower panel sheet may include various functional sheets for protecting the display panel from heating, external impact, and the like.

The display device may further include an output parts for outputting sound. In order to output the sound, a speaker including a separate diaphragm is generally incorporated in the display device.

SUMMARY

When a speaker including a separate diaphragm is disposed (e.g., mounted) on the display device, manufacturing cost may be increased and sliming of a display device may retrogress.

Exemplary embodiments of the invention are to provide a display device securing a sufficient vibration space while using a display panel as a diaphragm.

However, exemplary embodiments of the invention are not restricted to the one set forth herein. The above and other exemplary embodiments of the invention will become more apparent to one of ordinary skill in the art to which the invention pertains by referencing the detailed description of the invention given below.

An exemplary embodiment may be related a display device. The display device includes a display panel, a vibration sound device disposed below the display panel, a lower panel sheet disposed adjacent to the vibration sound device below the display panel and including a functional layer and a bottom coupling layer disposed on a lower surface of the functional layer, and a bracket disposed below the vibration sound device and the lower panel sheet and coupled with the bottom coupling layer, wherein the bottom coupling layer partially exposes the lower surface of the functional layer, a separation space is defined between the bracket and the lower surface of the functional layer where the bottom coupling layer is exposed, and the separation space is partially connected with the vibration sound device.

An exemplary embodiment may be related a display device. The display device includes a display panel, a vibration sound device disposed below the display panel, a lower panel sheet disposed adjacent to the vibration sound device below the display panel, and a bracket disposed below the vibration sound device and the lower panel sheet, wherein the lower panel sheet is attached to each of the display panel and the bracket, the lower panel sheet includes a coupling material pattern that couples portions of members which are adjacent to each other in a predetermined direction perpendicular to a plane of the lower panel sheet and separates remaining portions of the members from each other, and a space between the adjacent members spaced by the coupling material pattern layer is spatially connected with the vibration sound device.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
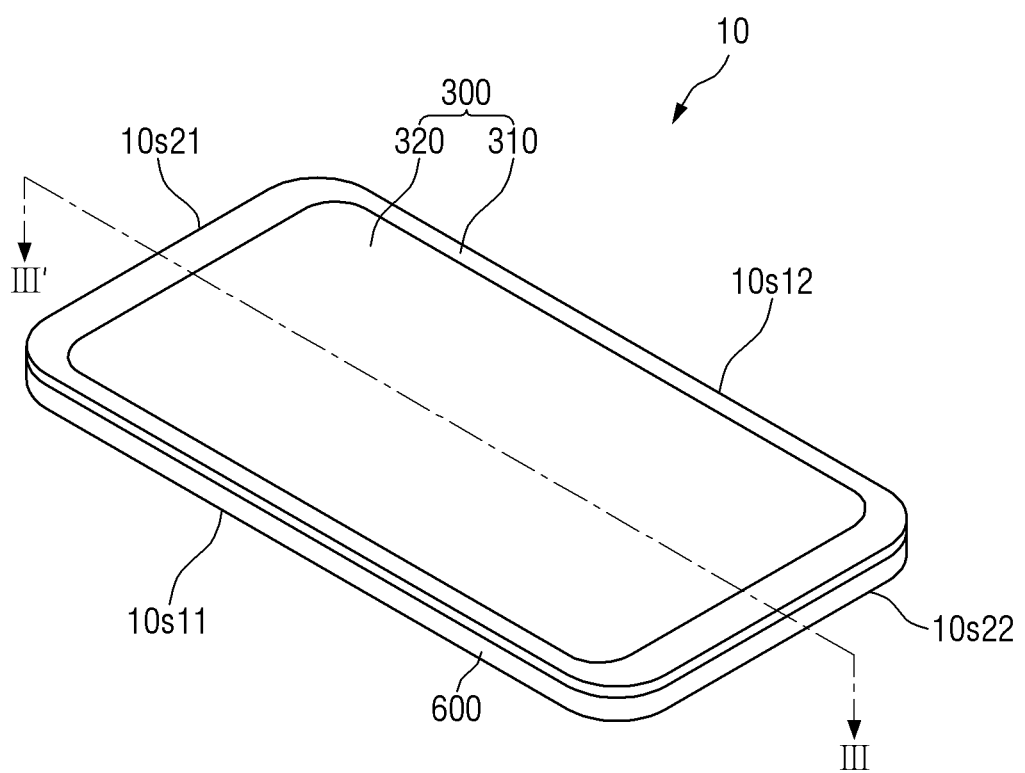
FIG. 1 is a perspective view of an exemplary embodiment of a display device.

The invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this invention will be thorough and complete, and will fully convey the scope of the invention to those skilled in the art. The same reference numbers indicate the same components throughout the specification. In the attached drawing figures, the thickness of layers and regions is exaggerated for clarity. Throughout the specification, the same reference numerals are used for the same or similar parts.

It will also be understood that when a layer is referred to as being "on" another layer or substrate, it may be directly on the other layer or substrate, or intervening layers may also be present. In contrast, when an element is referred to as being "directly on" another element, there are no intervening elements present.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting. As used herein, the singular forms "a," "an," "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments will be described with reference to the accompanying drawings.

Figure 2:
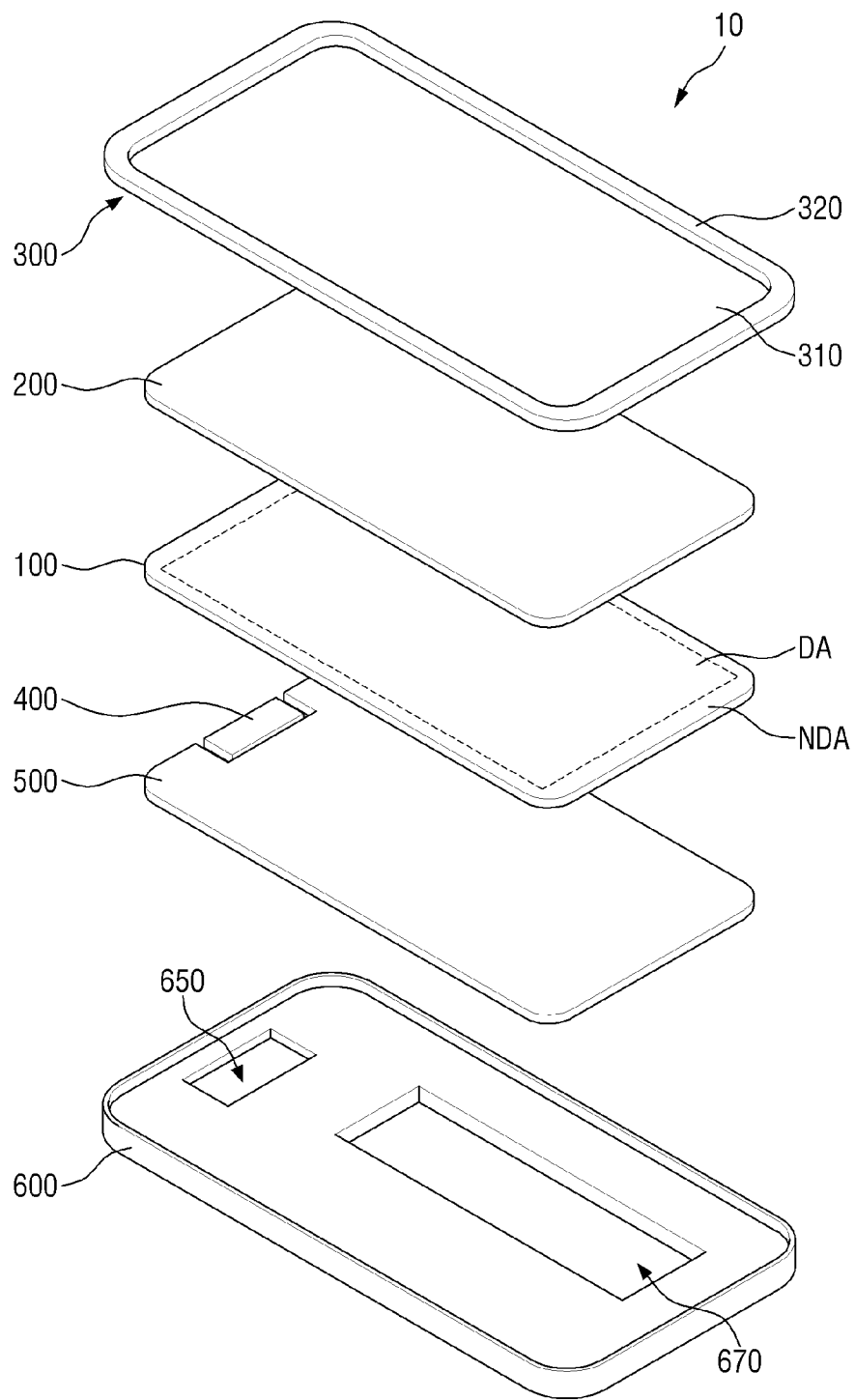
FIG. 2 is an exploded perspective view of the display device of FIG. 1.
Figure 3:
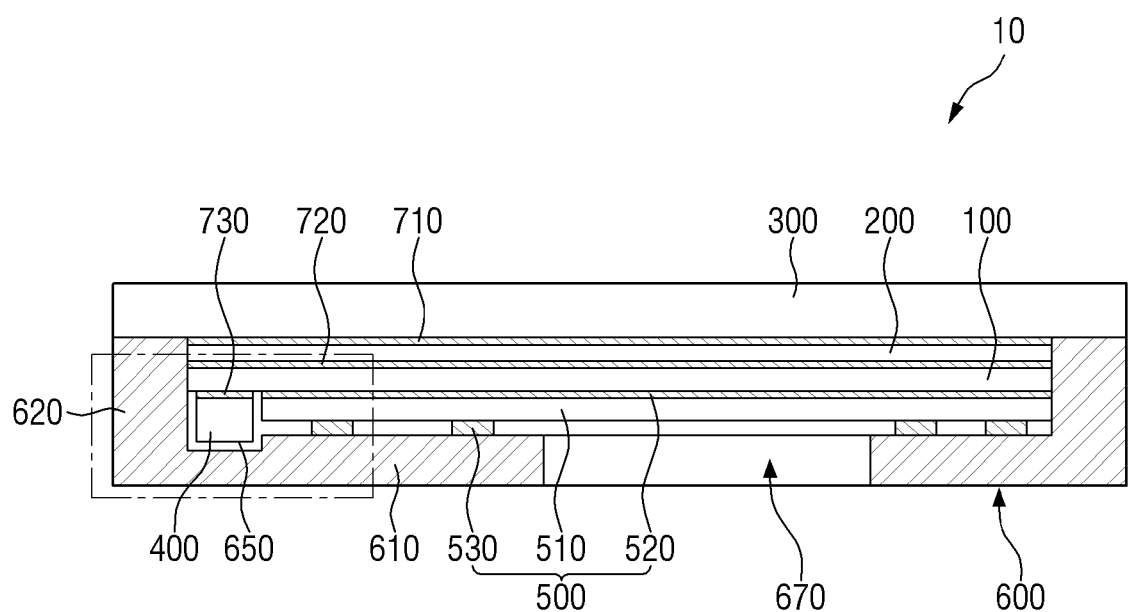
FIG. 3 is a cross-sectional view taken along line of FIG. 1.
Figure 4:
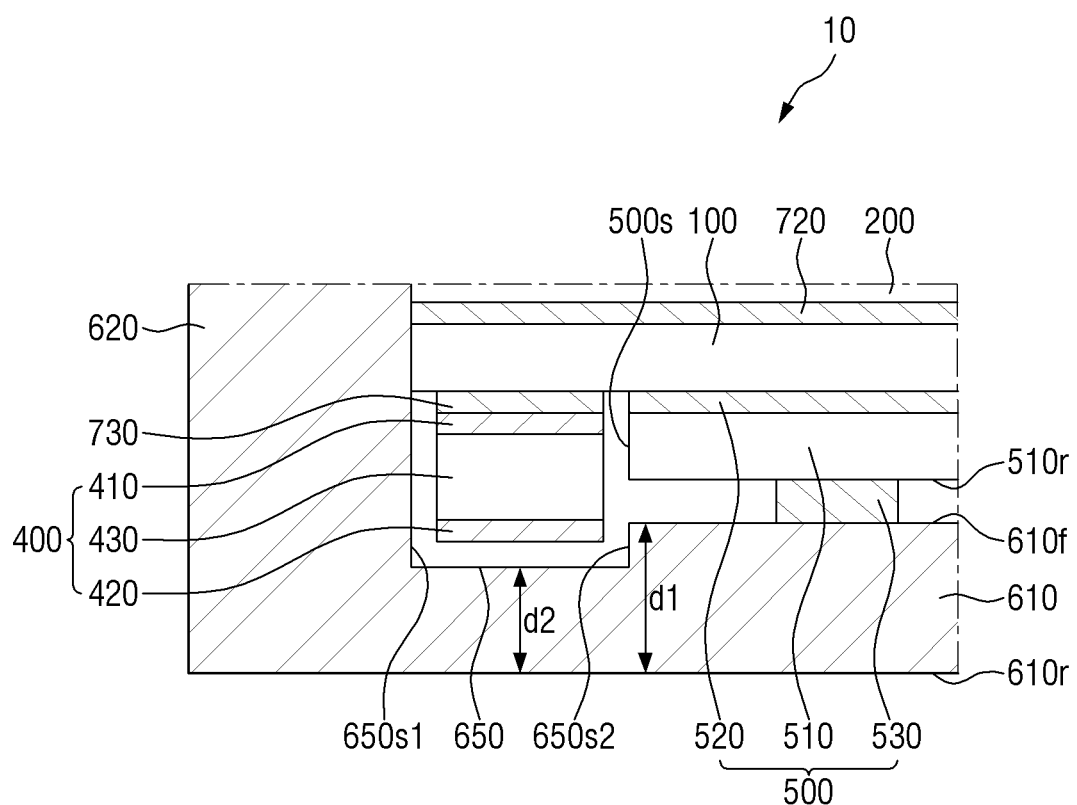
FIG. 4 is an enlarged diagram of a dotted part of FIG. 3.
Figure 5:
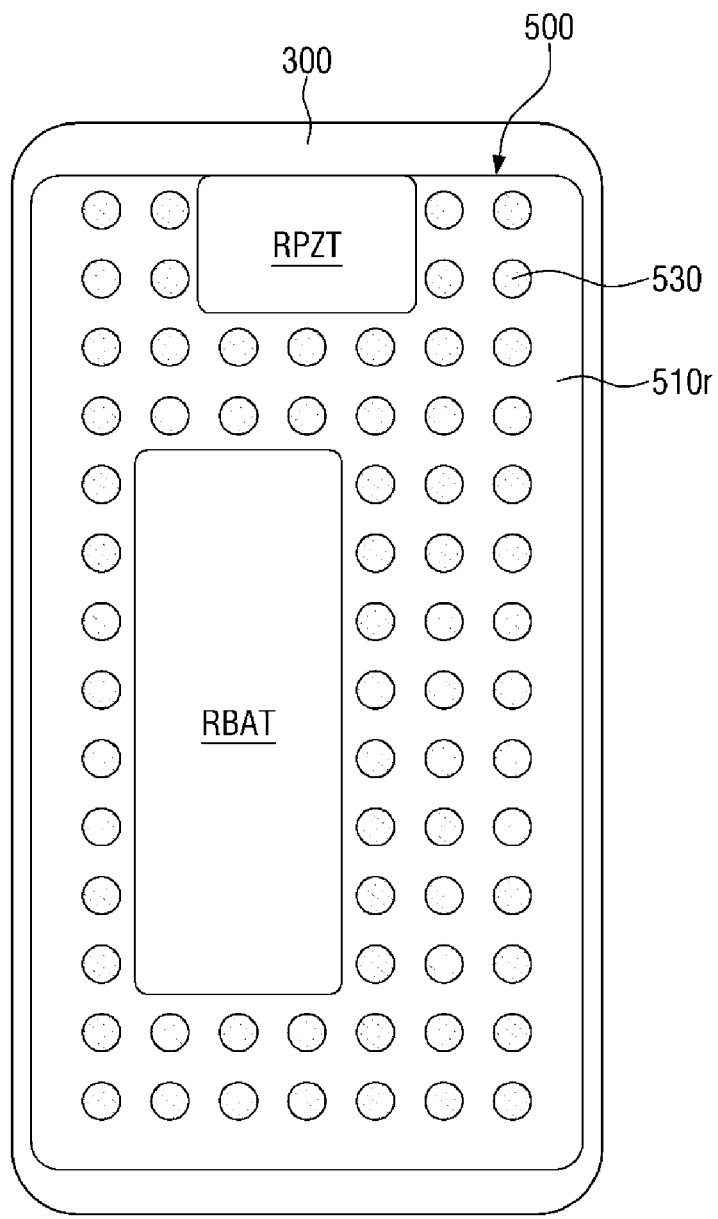
FIG. 5 is a diagram illustrating a plan view of an exemplary embodiment of a bottom coupling layer.

FIG. 1 is a perspective view of a display device according to an exemplary embodiment. FIG. 2 is an exploded perspective view of the display device of FIG. 1. FIG. 3 is a cross-sectional view taken along line of FIG. 1. FIG. 4 is an enlarged diagram of a dotted part of FIG. 3. FIG. 5 is a diagram illustrating a plan view of a bottom coupling layer according to an exemplary embodiment.

The display device is a device for displaying a video or an image. The display device is not limited thereto, but may be used for a display device such as a smart phone, a tablet personal computer ("PC"), a personal digital assistant ("PDA"), a portable multimedia player ("PMP"), a game device, a wristwatch type electronic device, a personal computer, a notebook computer, a car navigation device, a digital camera, a television, an external billboard, and the like.

Referring to FIGS. 1 to 5, the display device 10 includes a display panel 100 and a vibration sound device 400 and a lower panel sheet 500 disposed below the display panel 100, and a bracket 600 disposed below the sound vibration device 400 and the lower panel sheet 500. The display device 10 may further include a touch member 200 and a window 300 disposed above the display panel 100.

Unless otherwise defined, the terms "above", "top", and "upper surface" in the specification refer to a display surface based on the display panel 100 and the terms "below", "bottom", and "lower surface" refer to an opposite side of the display surface based on the display panel 100.

The display device 10 may have a rectangular shape in plan view. The display device 10 may include both long sides (a first long side 10s11 and a second long side 10s12) and both short sides (a first short side 10s21 and a second short side 10s22). Corners where the long sides 10s11 and 10s12 and the short sides 10s21 and 10s22 of the display device 10 meet may be right-angled, but may be curved as illustrated in FIG. 1. A planar shape of the display device 10 is not limited to the illustrated exemplary embodiment, and may be circular or some other shape.

The display panel 100 which displays a screen may include, for example, an organic light emitting display panel. In the following exemplary embodiments, it is exemplified that the display panel 100 is the organic light emitting display panel. However, the invention is not limited thereto, and the display panel 100 may include other types of display panels such as a liquid crystal display panel, an electrophoretic display panel, a plasma display panel.

The display panel 100 includes a plurality of organic light emitting devices arranged on a substrate. The substrate may be a rigid substrate including glass, or the like or a flexible substrate including polyimide, or the like. When the substrate may include a polyimide substrate, the display panel 100 may be curved, bent, folded, or rolled. The display panel 100 may include a display area DA and a non-display area NDA disposed around the display area DA.

The window 300 is disposed above the display panel 100. The window 300 is disposed above the display panel 100 to protect the display panel 100 and transmit light emitted from the display panel 100. In an exemplary embodiment, the window 300 may include glass, sapphire, plastic, or the like, for example.

The window 300 may overlap the display panel 100 and cover an entire surface of the display panel 100. The window 300 may be larger than the display panel 100. In an exemplary embodiment, on both short sides of the display device 10, the window 300 may protrude outward from the display panel 100, for example. The window 300 may protrude from the display panel 100 even on both long sides 10s11 and 10s12 of the display device 10, but a protrusion distance may be larger for both short sides 10s21 and 10s22.

The window 300 may include an ornament and/or light shielding pattern 320 positioned on a periphery. The ornament and/or light shielding pattern 320 overlaps the non-display area NDA of the display panel 100 to prevent the non-display area NDA from being viewed. A central portion 310 of the window 300 overlaps the display area DA of the display panel 100 to transmit light emitted from the display area DA.

In an exemplary embodiment, the touch member 200 may be disposed between the display panel 100 and the window 300. In an exemplary embodiment, the touch member 200 may be a rigid panel type, a flexible panel type, or a film type, for example. The touch member 200 may have substantially the same size as that of the display panel 100 and may overlap the display panel 100 and the side of the touch member 200 and the side of the display panel 100 may be aligned with each other, but the invention is not limited thereto. The display panel 100 and the touch member 200 and the touch member 200 and the window 300 are coupled to each other by transparent coupling layers 720 and 710 such as an optical clear adhesive ("OCA") and an optical clear resin ("OCR"), respectively. The touch member 200 may be omitted. In this case, the display panel 100 and the window 300 may be directly coupled by the OCA or the OCR. In some exemplary embodiments, the display panel 100 may include a touch electrode portion therein.

The vibration sound device 400 and the lower panel sheet 500 are disposed below the display panel 100. Each of the vibration sound device 400 and the lower panel sheet 500 is disposed between the display panel 100 and the bracket 600.

The vibration sound device 400 generates vibration in response to a sound signal. In an exemplary embodiment, the vibration sound device 400 may include a piezoelectric device that includes a vibration material layer 430. The vibration sound device 400 is described in more detail with reference to FIG. 6.

Figure 6:
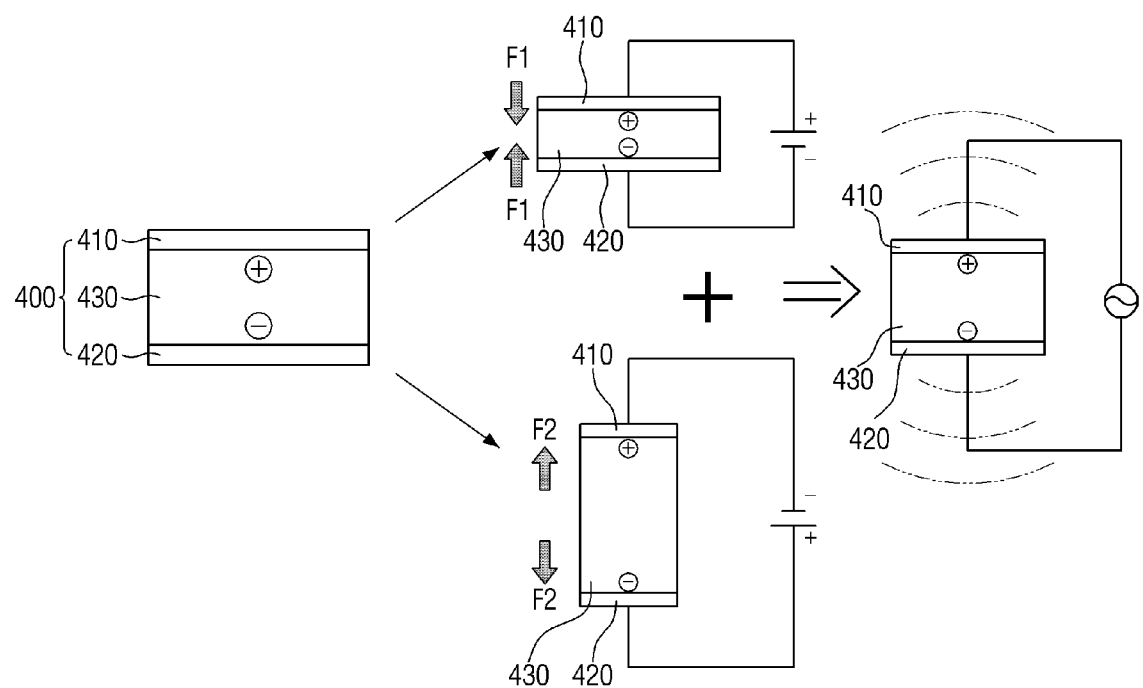
FIG. 6 is a conceptual diagram for describing an exemplary embodiment of an operation characteristic of a vibration sound device.

FIG. 6 is a conceptual diagram for describing an operation characteristic of a vibration sound device according to an exemplary embodiment. Referring to FIG. 6, the vibration sound device 400 may include a first electrode 410, a second electrode 420 facing the first electrode 410, and the vibration material layer 430 interposed between the first electrode 410 and the second electrode 420.

The first electrode 410 and the second electrode 420 may include a conductive material. In an exemplary embodiment, the first electrode 410 and the second electrode 420 may include a transparent conductor such as indium tin oxide ("ITO") or indium zinc oxide ("IZO"), opaque metal, a conductive polymer, or a carbon nanotube ("CNT").

The vibration material layer 430 may include a piezo material that vibrates by an electric field. In an exemplary embodiment, the vibration material layer 430 may include at least one of a piezoelectric film such as lead zircon titanate ("PZT") ceramics, and the like, a piezoelectric film such as a polyvinylidene fluoride ("PVDF") film, and an electroactive polymer.

The vibration material layer 430 may be compressed or relaxed according to a polarity of a voltage. In an exemplary embodiment, as illustrated in FIG. 6, when a positive voltage is applied to the first electrode 410 and a negative voltage is applied to the second electrode 420, compressive force F1 is applied to the vibration material layer 430, and as a result, the vibration material layer 430 may be shrunk in a thickness direction (e.g., a vertical direction in FIG. 2), for example. When the negative voltage is applied to the first electrode 410 and the positive voltage is applied to the second electrode 420, relaxation force F2 is applied to the vibration material layer 430, and as a result, the vibration material layer 430 may be expanded in the thickness direction. Therefore, when an alternating voltage of which the polarity is alternatively changed is applied to the first electrode 410 and the second electrode 420, the vibration material layer 430 may be repeatedly shrunk and expanded. Such a phenomenon may cause vibration in an adjacent display panel 100. The adjacent display panel 100 itself may serve as the diaphragm of the speaker. That is, the sound (noise) may be generated by a pressure change of air generated by the vibration of the display panel 100. When the organic light emitting display panel is used as the display panel 100, a sound may be generated without screen distortion due to vibration.

In general, the larger the size of the diaphragm, the greater the intensity of the sound pressure of the sound output from the diaphragm and the better the output characteristics in the low frequency range. When a large display panel 100 occupying a relatively large area in the display device 10 is used as the diaphragm, it is easy to secure a wider diaphragm area than the display device 10 having a separate diaphragm, thereby excellent sound and low-frequency output characteristics may be obtained. In addition, since the display panel 100 itself is used as the diaphragm, it is not necessary to provide the separate speaker, so that the size of the display device 10 may be reduced and the structure of the display device 10 may be simplified.

In the exemplary embodiment of FIG. 6, the case where the vibration sound device 400 includes the piezoelectric device is described as an example, but the invention is not limited thereto. In an exemplary embodiment, the vibration sound device 400 includes a permanent magnet and a coil which surrounds the permanent magnet and on which a current corresponding to a sound signal flows and may generate the vibration by electromagnetic force generated by the which flows on the coil, for example.

Referring back to FIGS. 1 to 5, the lower panel sheet 500 is disposed below the display panel 100 and may perform a heat radiating function, an electromagnetic wave shielding function, a pattern visibility preventing function, a grounding function, a buffering function, a strength reinforcing function, and/or a digitizing function. The lower panel sheet 500 may include a functional layer 510 having at least one of the functions described above. The functional layer 510 may be provided in various forms including a layer, a film, a film, a sheet, a plate, a panel, and the like. In an exemplary embodiment, the lower panel sheet 500 may include a buffer sheet, a graphite sheet, and a copper sheet that are sequentially laminated from top to bottom, for example.

The vibration sound device 400 may be disposed adjacent to one side (e.g., the first short side 10s21) of the display device 10. A width of the vibration device in the direction of the first short side 10s21 is smaller than the width of the first short side 10s21 of the display device 10 when the vibration sound device 400 is disposed adjacent to the first short side 10s21 of the display device 10. The width of the vibration sound device 400 in the direction of the first short side 10s21 may be smaller than the width of the display area DA in the direction of the first short side 10s21 and may not be disposed in the non-display area NDA positioned on both long sides 10s11 and 10s12 of the display device 10.

The vibration sound device 400 may be disposed at a boundary between the display area DA and the non-display area NDA of the display panel 100 in plan view. A part of the vibration sound device 400 overlaps the non-display area NDA positioned near the first short side 10s21 and the other part of the vibration sound device 400 overlaps the display area DA. However, the invention is not limited thereto, and the entirety of the vibration sound device 400 may overlap the non-display area NDA or may overlap the display area DA. In the drawing, it is illustrated that one vibration sound device 400 is disposed near the first short side 10s21, but a plurality of the vibration sound devices 400 may be disposed. In an exemplary embodiment, one vibration sound device 400 may be disposed near the first short side 10s21 and the other vibration sound device 400 may be disposed near the second short side 10s22, for example.

The lower panel sheet 500 may be disposed adjacent to the vibration sound device 400. The lower panel sheet 500 may mostly overlap the display panel 100. In an exemplary embodiment, the lower panel sheet 500 may not overlap the vibration sound device 400. That is, the lower panel sheet 500 may not be disposed in a region where the vibration sound device 400 is disposed, while the vibration sound device 400 may not be disposed in the area where the lower panel sheet 500 is disposed in plan view. The lower panel sheet 500 may have a shape occupying most of a region other than a part occupied by the vibration sound device 400 in a lower region which overlaps the display panel 100. The lower panel sheet 500 may at least partially surround the vibration sound device 400 in plan view. In the drawing, it is illustrated that the lower panel sheet 500 surrounds three sides among four sides of the vibration sound device 400 in plan view, but the invention is not limited thereto, and the lower panel sheet 500 may surround all sides of the vibration sound device 400.

The side of the vibration sound device 400 and a side 500s of the lower panel sheet 500, which face each other may be in contact with each other, but may be spaced apart from each other by a predetermined interval.

A thickness of the vibration sound device 400 may be larger than the thickness of the lower panel sheet 500. The upper surface of the vibration sound device 400 is substantially aligned with the upper surface of the lower panel sheet 500 while the lower surface of the vibration sound device 400 may protrude downward of the lower surface of the lower panel sheet 500.

The bracket 600 is disposed below the vibration sound device 400 and the lower panel sheet 500. The bracket 600 may be a storage container or a protective container for storing other components. In an exemplary embodiment, the bracket 600 may store the window 300, the touch member 200, the display panel 100, the vibration sound device, and the lower panel sheet 500, for example.

The bracket 600 may include a bottom portion 610 and a side wall 620. An upper surface 610f of the bottom portion 610 of the bracket 600 faces the lower surface of the vibration sound device 400 and the lower surface of the lower panel sheet 500, and the side wall 620 of the bracket 600 faces the sides of the touch member 200, the display panel 100, and the lower panel sheet 500. An upper end of the side wall of the bracket 600 faces the window 300. An outer surface of the bracket 600 may be aligned with the outer surface of the window 300. In an exemplary embodiment, the window 300 may be attached to the bracket 600 through a waterproof tape, for example.

Although not illustrated, the side wall 620 of the bracket 600 is positioned outside the outer surface of the window 300 and the side wall of the bracket 600 may face the outer surface of the window 300.

A concave groove 650 may be defined in the upper surface 610f of the bottom portion 610 of the bracket 600. The vibration sound device 400 that protrudes relatively downward of the lower panel sheet 500 may be received in the concave groove 650 of the bottom portion 610. The lower surface and the side of the vibration sound device 400 may be spaced apart from the upper surface 610f of the bottom portion 610 of the bracket 600 in which the concave groove 650 is defined. However, the invention is not limited thereto and the lower surface and/or the side of the vibration sound device 400 may be partially in contact with the concave groove 650 or coupled through a double-sided tape, or the like.

One inner wall 650s1 of the concave groove 650 may be connected with one side wall 620 of the bracket 600, but the invention is not limited thereto. A side 500s of the lower panel sheet 500 near the concave groove 650 may be aligned with an inner wall 650s2 or positioned inside the inner wall 650s2.

A lower surface 610r of the bottom portion 610 of the bracket 600 may be flat. Therefore, in the bottom portion 610 of the bracket 600, a thickness d2 of a region where the vibration sound device 400 is disposed, that is, a region where the concave groove 650 is defined may be smaller than a thickness d1 of the other region. The thickness d1 of the bottom portion 610 of the bracket 600 in a region where the vibration sound device 400 is not disposed may be uniform.

In some exemplary embodiments, a hole penetrating in the thickness direction may be further defined in the bottom portion 610 of the bracket 600. In an exemplary embodiment, a battery hole 670 into which a battery is inserted may be defined in the bottom portion 610 of the bracket 600, for example. The battery hole 670 may be substantially defined in a central region of the bottom portion 610 of the bracket 600. The battery hole 670 may overlap the lower panel sheet 500 thereabove. That is, although the lower panel sheet 500 is removed at a corresponding location of the concave groove 650, the lower panel sheet 500 is disposed at a corresponding location of the battery hole 670 to cover the battery hole 670. As described below, a bottom coupling layer 530 of the lower panel sheet 500 is not disposed in a region which overlaps the battery hole 670.

The vibration sound device 400 may be coupled to the display panel 100. In an exemplary embodiment, the upper end (the upper surface of the first electrode 410 in the drawing) of the vibration sound device 400 may be attached to the lower surface of the display panel 100 by a coupling member 730, for example. The coupling member 730 may be a bonding layer, an adhesive layer, or a double-sided bonding tape. The lower surfaces of the vibration sound device 400 and the display panel 100 may be coupled via other members, for example, one or more functional layers or coupling layers constituting the lower panel sheet 500.

In another exemplary embodiment, the vibration sound device 400 may be in direct contact with the lower surface of the display panel 100. In an exemplary embodiment, when the first electrode 410 of the vibration sound device 400 is directly disposed on the lower surface of the display panel 100, the first electrode 410 and the bottom of the display panel 100 may be in direct contact with each other or may be coupled with each other, for example. The vibration sound device 400 may be coupled with the lower surface of the display panel 100 while being in contact with each other by other coupling parts.

As such, when the vibration sound device 400 is coupled to the display panel 100, the vibration caused by the vibration sound device 400 is transferred to the display panel 100, and as a result, the entirety of the display panel 100 may serve as the diaphragm.

The lower panel sheet 500 may be fixed to both the display panel 100 and the bracket 600. To this end, the lower panel sheet 500 may include a top coupling layer 520 and the bottom coupling layer 530. Each of the top coupling layer 520 and the bottom coupling layer 530 may include the bonding layer, the adhesive layer, or a resin layer. In an exemplary embodiment, each of the top coupling layer 520 and the bottom coupling layer 530 may include polymer materials classified into silicone based, urethane based, a SU polymer having a silicon-urethane hybrid structure, acryl based, isocyanate based, polyvinyl alcohol based, gelatin based, vinyl based, latex based, polyester based, water-based polyester based, and the like, for example.

The top coupling layer 520 is disposed on the top of the lower panel sheet 500 to couple the lower panel sheet 500 to the display panel 100. The top bonding layer 520 may cover an entire area of the lower panel sheet 500.

The bottom coupling layer 530 is disposed at a lowermost portion of the lower panel sheet 500 to couple the lower panel sheet 500 and the bracket 600. In an exemplary embodiment, the thickness of the bottom coupling layer 530 may be larger than the thickness of the top coupling layer 520. In an exemplary embodiment, the thickness of the bottom coupling layer 530 may be about 60 micrometers (μm) to about 120 μm, but the invention is not limited thereto, for example. The bottom coupling layer 530 exposes at least a part of a lower surface 510r of the functional layer 510 of the lower panel sheet 500.

In an exemplary embodiment, as illustrated in FIG. 5, the bottom coupling layer 530 may have a plurality of island-type patterns spaced apart from each other. The island-type pattern bottom coupling layer 530 may be disposed at a substantially uniform density throughout a region other than the region where the battery hole 670 of the bottom portion 610 of the bracket 600 is defined, for example. The planar shape of the island-type pattern bottom coupling layer 530 may be circular, but may be a square or other polygonal shape and is not limited to the above examples.

The lower panel sheet 500 and the bracket 600 may be spaced apart from each other in a part where the bottom coupling layer 530 is not disposed. The part (that is, a separation space between the lower panel sheet 500 and the bracket 600) where the bottom coupling layer 530 is not disposed may be disposed throughout the lower panel sheet 500. Empty spaces in which the bottom coupling layer 530 is not disposed may be connected to each other and may further be spatially connected up to the vibration sound device 400. The empty space may be an echo space serving as a soundbox of the speaker. The echo space may amplify the sound generated by the vibration sound device 400. The larger the echo space, the greater an amplification effect. An entire region without the island type bottom coupling layer 530 in the entire area under the display panel 100 may be used as the echo space to configure an efficient echo space as compared with a total size of the display device 10. In addition, when the empty space is connected up to the battery hole 670, the empty space (the separation space between the battery and the lower panel sheet 500 when the battery is disposed (e.g., mounted)) of the battery hole 670 may also be used as the echo space, and as a result, the sound may be more effectively amplified.

As described above, the bottom coupling layer 530 may couple the bracket 600 and the lower panel sheet 500. Accordingly, the bottom coupling layer 530 may have predetermined elasticity to more effectively transmit the vibration generated by the vibration sound device 400 to the display panel 100. In some exemplary embodiments, the bottom coupling layer 530 may have a Young's modulus of about 2 gigapascals (Gpa) or less, for example. In the case where the bottom coupling layer 530 has the Young's modulus of about 2 Gpa or less, the vibration may be effectively transmitted to the display panel 100 even when the vibration sound device 400 performs vibration having a large vertical width in order to realize a mid and low-tone sound.

The lower surface of the lower panel sheet 500 directly facing the bottom portion 610 of the bracket 600 except for the region corresponding to the concave groove 650 and the battery hole 670 may be divided into a coupling region where the bottom coupling layer 530 is disposed to be coupled with the bottom portion 610 of the bracket 600 and a separation region which is spaced apart from the bottom portion 610 of the bracket 600 because the bottom coupling layer 530 is not disposed. The area (total area) of the separation region may be larger than the area (total area) of the coupling region to ensure a sufficient echo space.

According to the above-described embodiment, even when the separation space between the vibration sound device 400 and the concave groove 650 of the bracket 600 is not provided or the size thereof is not sufficient, the sound is amplified through the echo space between the lower panel sheet 500 and the bracket 600 to enrich the sound. Accordingly, since the bracket 600 does not need to be further protruded downward or the thickness of the bracket 600 does not need to be made excessively thin so as to secure a sufficient separation space between the vibration sound device 400 and the concave groove 650 of the bracket 600, the size of the display device 10 may be reduced and the strength of the bracket 600 may be maintained.

Figure 7:
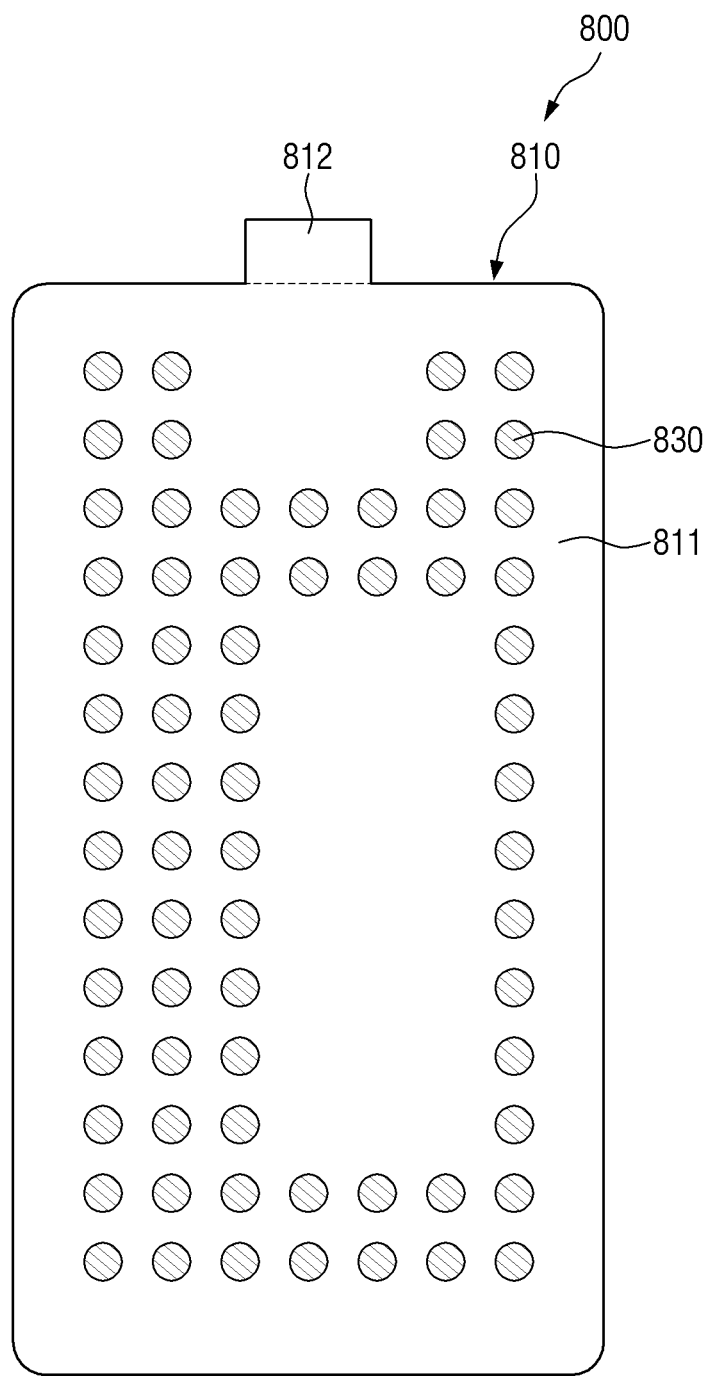
FIG. 7 is a plan view of a transfer film including a coupling material pattern.
Figure 8:
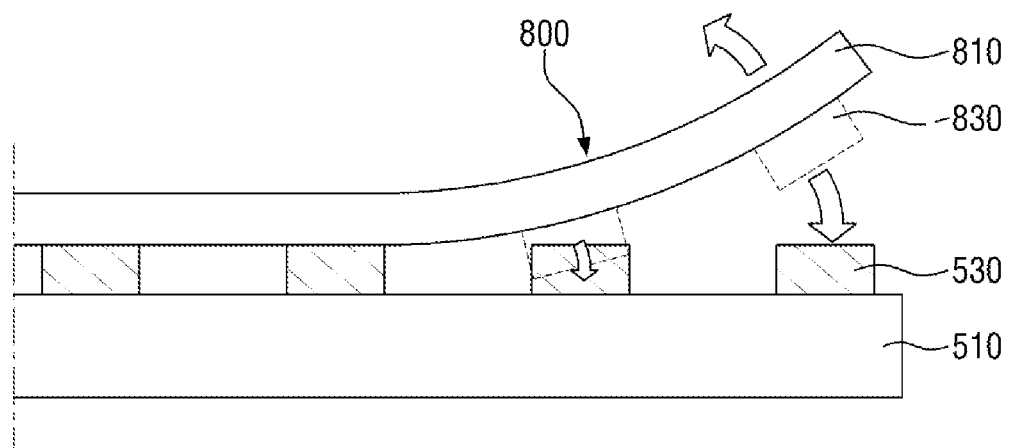
FIG. 8 is a cross-sectional view illustrating a process of peeling a cover film after attaching the transfer film to a functional layer of a lower panel sheet.

FIG. 7 is a plan view of a transfer film including a coupling material pattern. FIG. 8 is a cross-sectional view illustrating a process of peeling a cover film after attaching the transfer film to a functional layer of a lower panel sheet.

Referring to FIGS. 7 and 8, the transfer film 800 includes a cover film 810 and a coupling material pattern 830 disposed on the cover film 810. The coupling material pattern 830 is transferred to a constituent sheet or the functional layer 510 of the lower panel sheet 500 and a pattern shape thereof may be a bilateral symmetrical shape with respect to the pattern of the bottom coupling layer 530 of the lower panel sheet 500. The transfer film 800 is attached to the functional layer 510 of the lower panel sheet 500 with the coupling material pattern 830 facing the constituent sheet of the lower panel sheet 500 as illustrated in FIG. 8. Subsequently, the cover film 810 is peeled off and in this case, the coupling material pattern 830 is separated from the cover film 810 and remains on the surface of the functional layer 510 of the lower panel sheet 500, thereby providing the lower panel sheet 500 including the bottom coupling layer 530.

When coupling force between the cover film 810 and the coupling material pattern 830 is smaller than the coupling force between the functional layer 510 of the lower panel sheet 500 to which the coupling material pattern 830 is to be transferred and the coupling material pattern 830, it is advantageous to increase a transfer rate of the coupling material pattern 830. To this end, the surface of the cover film 810 is subjected to releasing treatment, and the coupling material pattern 830 may be disposed on the surface subjected to the releasing treatment.

The cover film 810 may include a cover portion 811 covering the lower panel sheet 500 and a pull tab portion 812 protruding outward from the cover portion 811. The pull tab portion 812 protruding from the cover portion 811 may be used to catch the cover film 810 when the cover film 810 is peeled off. The pull tab portion 812 may, for example, be positioned on the first short side 10s21 (refer to FIG. 1) of the display device 10 (refer to FIG. 1) and in this case, the cover film 810 may be peeled off from the first short side 10s21 toward the second short side 10s21. However, the invention is not limited thereto and the pull tab portion 812 may be positioned on the first long side 10s11 so that the cover film 810 may be peeled off from the first long side 10s11 toward the second long side 10s12 or peeled off in a diagonal direction. In another exemplary embodiment, the pull tab portion 812 may be provided on two or more sides of the cover film 810.

Hereinafter, other exemplary embodiments will be described. In the following description of the exemplary embodiments, the same components as those in the exemplary embodiment mentioned above will be referred to as the same reference numerals and differences will be mainly described and redundant description will be omitted or simplified.

FIGS. 9 to 17 are bottom views illustrating the plan view of the bottom coupling layer according to various embodiments. FIGS. 9 to 17 illustrate a state in which the bracket and the vibration sound device are not disposed (e.g., mounted) in the display device and 'RPZT' denotes a region corresponding to the concave groove of the bracket or a region in which the vibration sound device is disposed and 'RBAT' denotes a region corresponding to the battery hole.

Figure 9:
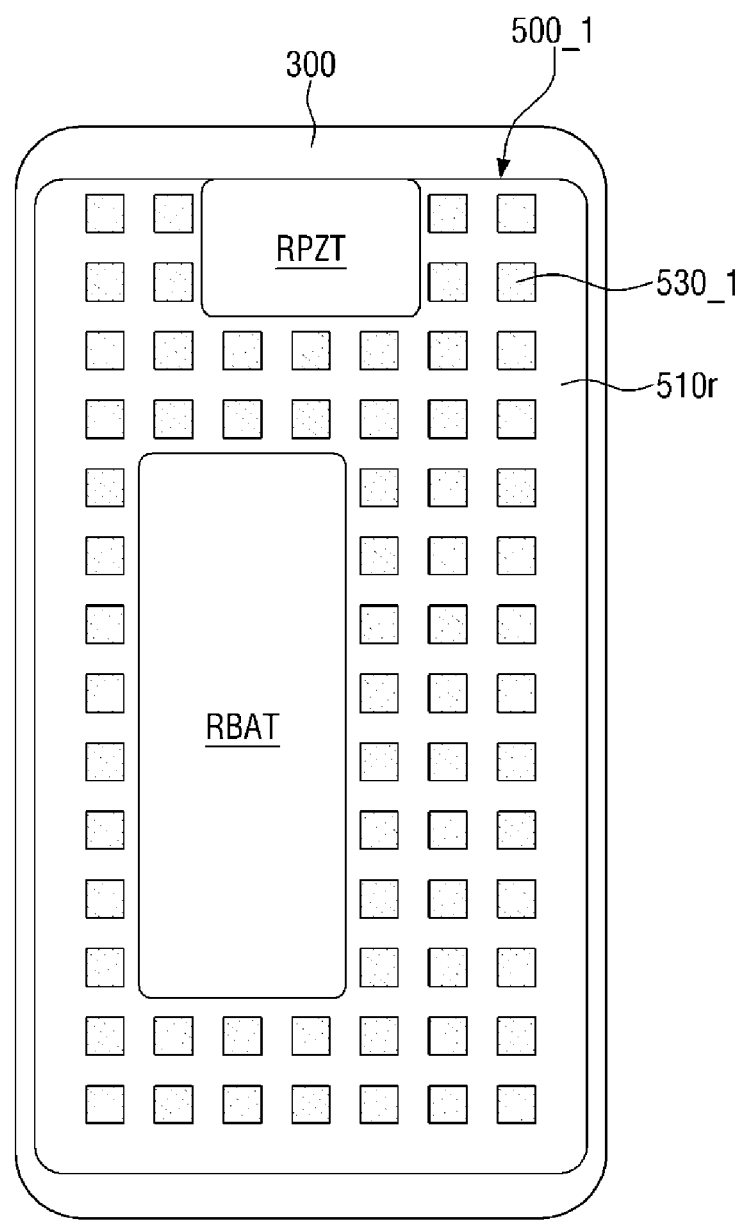
FIGS. 9 to 17 are bottom views illustrating the plan view of the bottom coupling layer according to various embodiments.

A lower panel sheet 500_1 according to the exemplary embodiment of FIG. 9 illustrates a case where a bottom coupling layer 530_1 has a square shape in plan view and is uniformly arranged in a matrix shape. In the exemplary embodiment of FIG. 9, the echo space has a lattice-like or mesh-like shape.

Figure 10A:
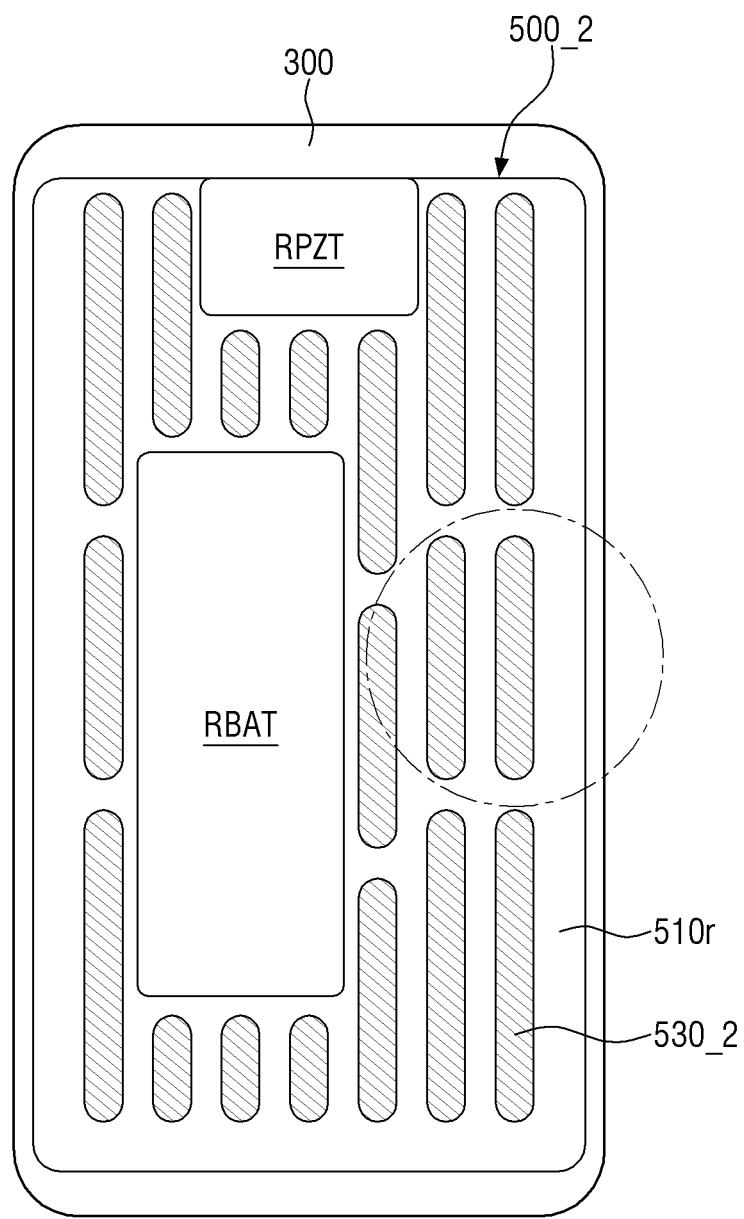
Figure 10B:
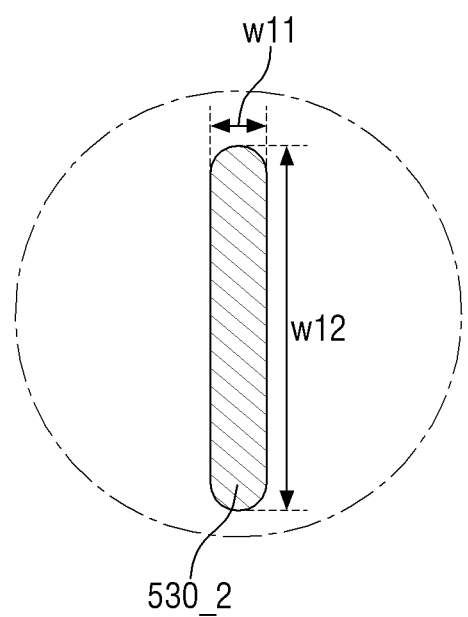

A lower panel sheet 500_2 according to the exemplary embodiment of FIGS. 10A and 10B exemplify a case where the island-type pattern of a bottom coupling layer 530_2 has a line shape or a stitched shape elongated in a planar longitudinal direction (a long side direction of the display device 10 (refer to FIG. 1)). The planar shape of each pattern of the bottom coupling layer 530_2 may be a rectangle, a rectangle having rounded corners, or an ellipse. A width w12 in the longitudinal direction of each pattern of the bottom coupling layer 530_2 is larger than a width w11 in the horizontal direction (a short side direction of the display device 10). In an exemplary embodiment, the width w12 in the longitudinal direction of each pattern of the bottom coupling layer 530_2 may be two or more times the width w11 in the horizontal direction, for example. When the width w12 in the longitudinal direction of the bottom bonding layer 530_2 is larger than the width w11 of the horizontal direction, the coupling material pattern 830 (refer to FIG. 8) is not easily separated from the constituent sheet (functional layer 510 (refer to FIG. 8)) of the lower panel sheet 500 when attaching the transfer film 800 (refer to FIG. 8) and thereafter, peeling off the attached transfer film 800 in the longitudinal direction, thereby increasing transfer efficiency.

Figure 11A:
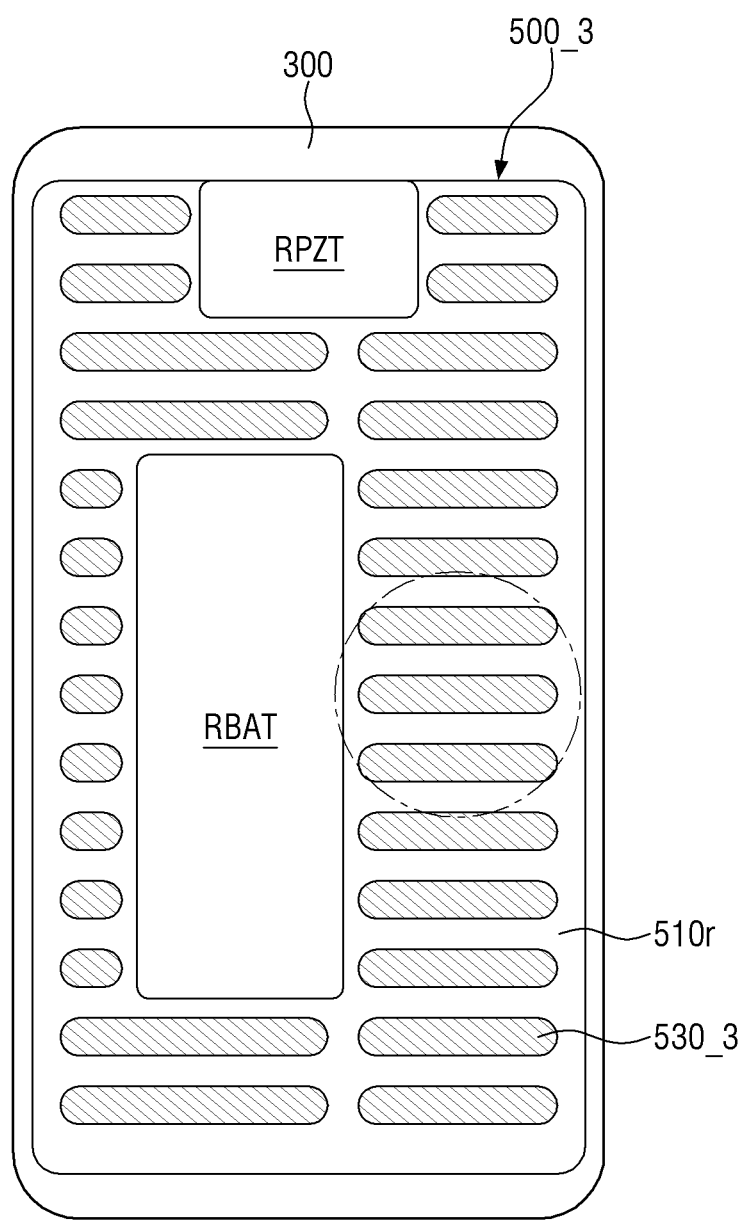
Figure 11B:
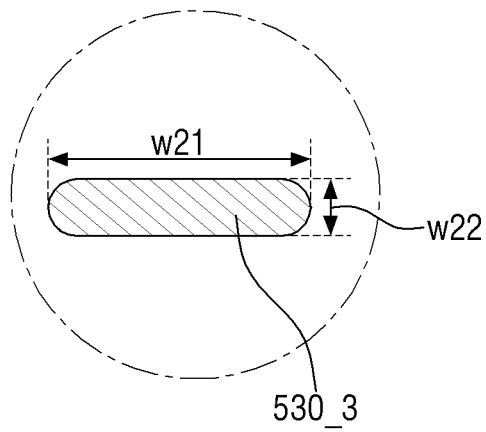

A lower panel sheet 500_3 according to the exemplary embodiment of FIGS. 11A and 11B exemplify a case where a bottom coupling layer 530_3 has the line shape or stitched shape elongated in the planar horizontal direction (short side direction of the display device 10 (refer to FIG. 1)). The planar shape of each pattern of the bottom coupling layer 530_3 may be the rectangle, the rectangle having rounded corners, or the ellipse. A width w21 in the horizontal direction of each pattern of the bottom coupling layer 530_3 is larger than a width w22 in the longitudinal direction (in the directions of long sides 10s11 (refer to FIG. 1) and 10s12 (refer to FIG. 1) of the display device 10). In an exemplary embodiment, the width w21 in the horizontal direction of each pattern of the bottom coupling layer 530_3 may be two or more times the width w22 in the longitudinal direction, for example. When the width w21 in the horizontal direction of the bottom coupling layer 530_3 is larger than the width w22 of the longitudinal direction, the coupling material pattern 830 (refer to FIG. 8) is not easily separated from the constituent sheet (functional layer 510 (refer to FIG. 8)) of the lower panel sheet 500_3 when attaching the transfer film 800 (refer to FIG. 8) and thereafter, peeling off the attached transfer film 800 in the longitudinal direction, thereby increasing the transfer efficiency.

Although not illustrated, each pattern of the bottom coupling layer may have the line shape or stitch shape elongated in the diagonal direction of the display device 10. In this case, it will be understood that when the transfer film 800 is peeled off in the diagonal direction, the coupling material pattern will not be easily separated from the constituent sheet of the lower panel sheet.

Figure 12:
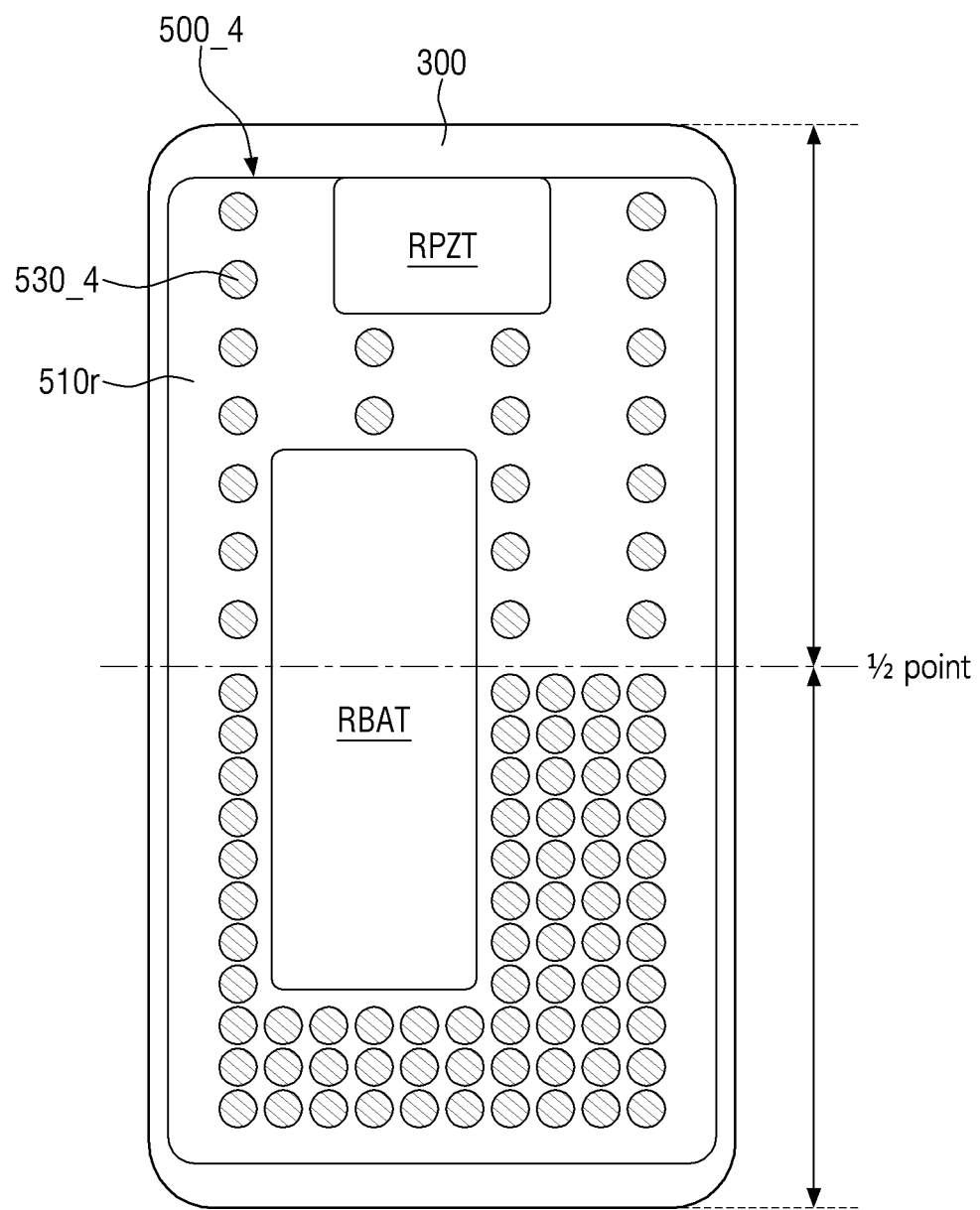

A lower panel sheet 500_4 according to the exemplary embodiment of FIG. 12 exemplifies that the density of a bottom coupling layer 530_4 may vary for each region. In an exemplary embodiment, as illustrated in FIG. 12, when the display device 10 (refer to FIG. 1) is divided in half in a transverse direction, when the region where the vibration sound device 400 (refer to FIG. 2) is disposed is defined as a first region and the region where the vibration sound device 400 is not disposed is defined as a second region, an area occupied by the bottom coupling layer 530_4 in the first region is smaller than an are occupied by the bottom coupling layer 530_4 in the second region, for example. In an exemplary embodiment, the density of the bottom coupling layer 530_4 may increase as the distance from the region in which the vibration sound device 400 is disposed increases.

When the density of the bottom coupling layer 530_4 in the first region around the region where the vibration sound device 400 is disposed is made small, the sufficient echo space is secured, thereby increasing sound pressure. By increasing the density of the bottom coupling layer 530_4 in the second region which is far from the vibration sound device 400, the coupling force between the lower panel sheet 500_4 and the bracket 600 (refer to FIG. 2) may be increased.

Figure 13:
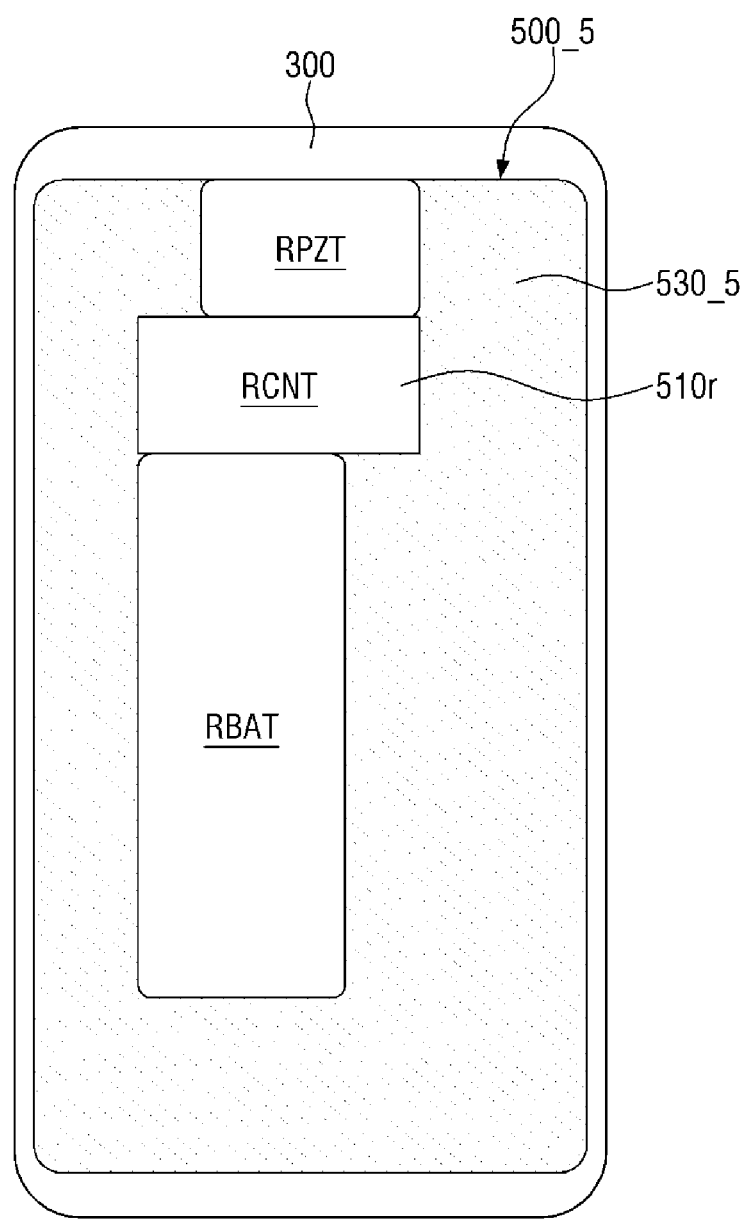

A lower panel sheet 500_5 according to the exemplary embodiment of FIG. 13 exemplifies a case where a bottom coupling layer is not disposed in a region RCNT connecting the region RPZT where the vibration sound device is disposed and the region RBAT corresponding to the battery hole. The bottom coupling layer 530_5 is not disposed in the connection region RCNT, so that the separation space may be defined and the echo space may be connected from the vibration sound device 400 (refer to FIG. 2) up to the battery hole 670 (refer to FIG. 2) through the separation space. The bottom coupling layer 530_5 is disposed in all regions other than the region RPZT where the vibration sound device is disposed, the region RBAT corresponding to the battery hole, and the connection region RCNT spatially connecting the regions RPZT and RBAT, thereby securing strong coupling force between the lower panel sheet 500 and the bracket 600. However, the invention is not limited thereto and the bottom coupling layer 530_5 may be disposed in the island-type pattern as illustrated in FIG. 5.

Figure 14:
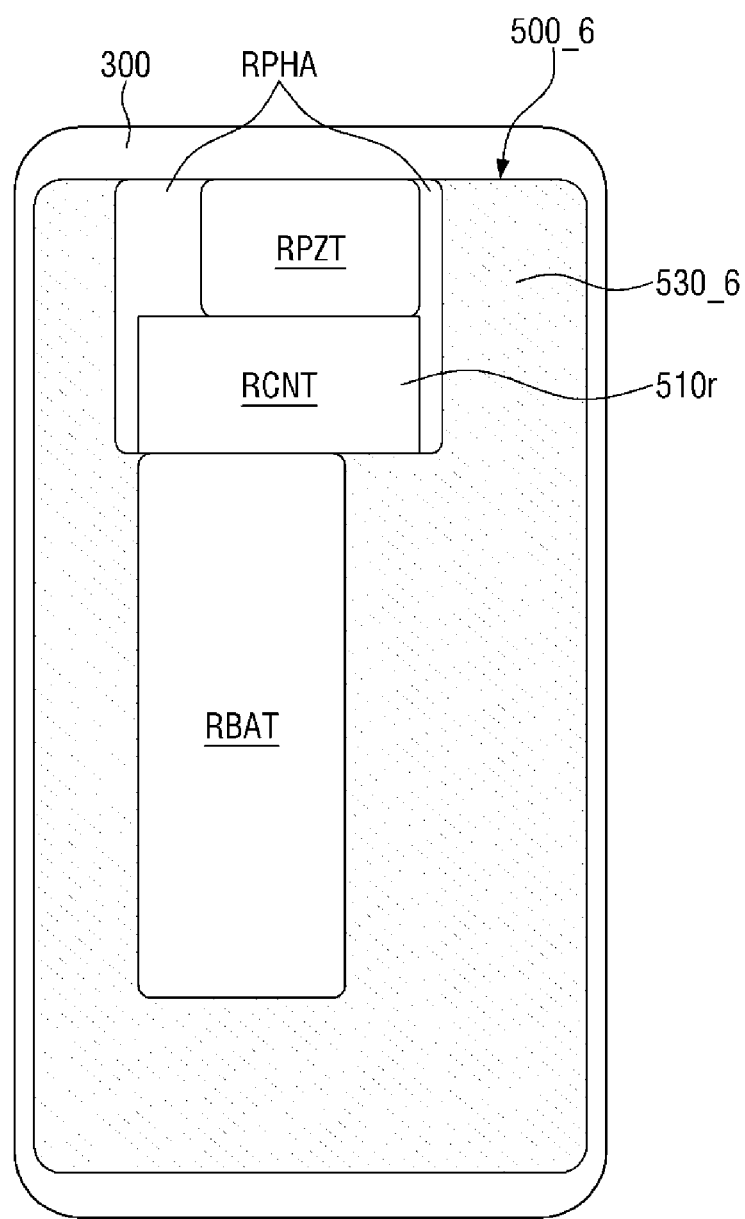

A lower panel sheet 500_6 according to the exemplary embodiment of FIG. 14 exemplifies a case where the bottom coupling layer 530_6 is not disposed even in a peripheral region RPHA of the region RPZT where the vibration sound device is disposed as well as the connection region RCNT in addition to the exemplary embodiment of FIG. 13. The peripheral region RPHA and the connection region RCNT may surround a part of the region RPZT where the vibration sound device is disposed.

Since the bottom coupling layer 530_6 is not disposed in the connection region RCNT and the peripheral area RPHA, the echo space may further be defined around the vibration sound device 400 (refer to FIG. 2) in addition to the exemplary embodiment of FIG. 13. Therefore, compared with the exemplary embodiment of FIG. 13, the echo space is further secured, thereby further increasing the sound pressure.

Figure 15:
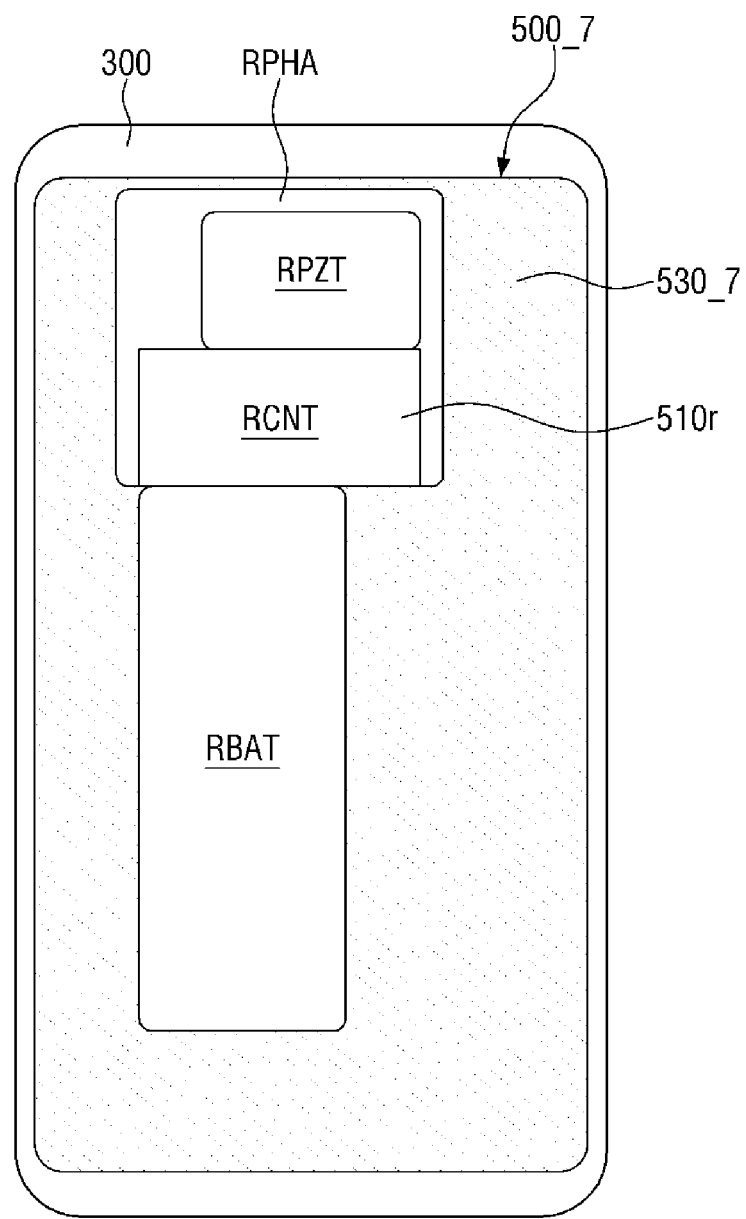

A lower panel sheet 500_7 according to the exemplary embodiment of FIG. 15 exemplifies a case where a bottom bonding layer 530_7 is not disposed in the connection region RCNT and the peripheral region RPHA, and the peripheral region RPHA and the connection region RCNT completely surround the region RPZT where the vibration sound device is disposed unlike the exemplary embodiment of FIG. 14. In the case of the exemplary embodiment, since the bottom coupling layer 530_7 completely surrounds the region RPZT where the vibration sound device is disposed, the sufficient echo space may be secured and impact resistance of the vibration sound device 400 (refer to FIG. 2) may be enhanced.

Figure 16:
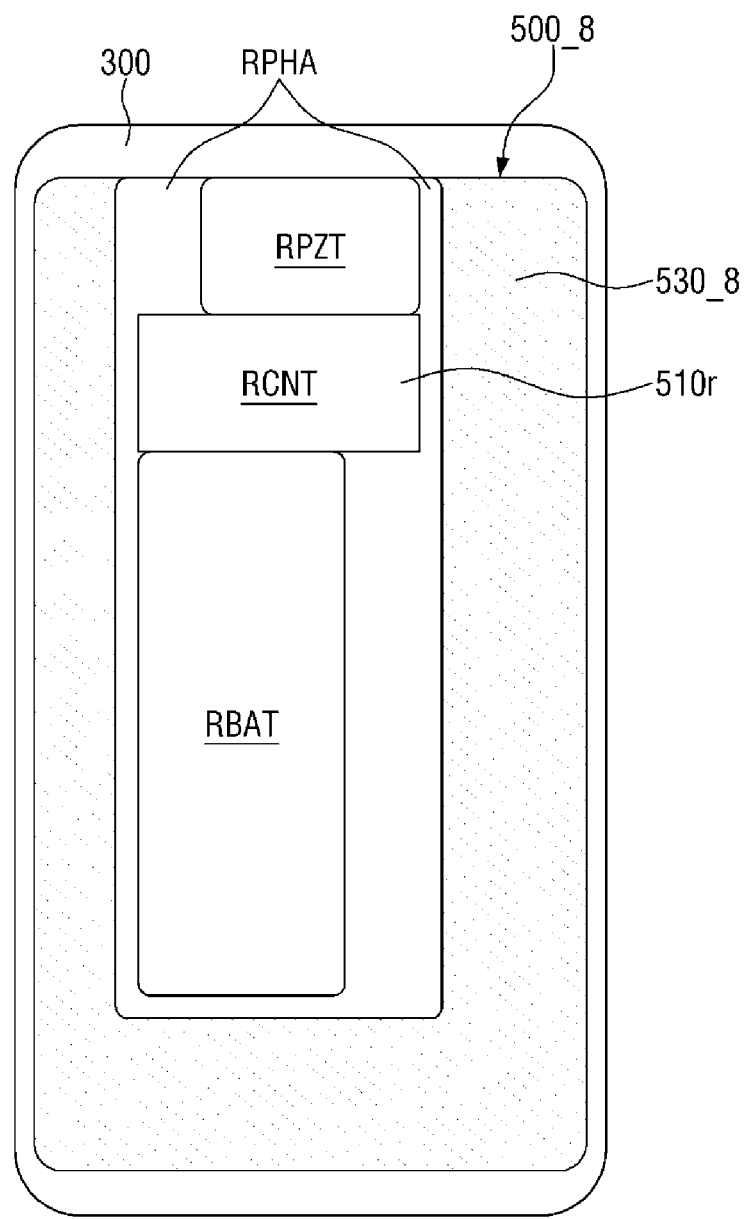

A lower panel sheet 500_8 according to the exemplary embodiment of FIG. 16 exemplifies a case where a bottom coupling layer 530_8 is not disposed in the connection region RCNT and the peripheral region RPHA, the peripheral region RPHA partially surrounds the region RPZT where the vibration sound device is disposed, and the peripheral region RPHA completely surrounds the connection region RCNT and the region RBAT corresponding to the battery hole in addition to the exemplary embodiment of FIG. 14.

In the case of the exemplary embodiment, as the area of a region where the bottom coupling layer 530_8 is not disposed increases, the echo space is further secured, thereby further increasing the sound pressure.

Figure 17:
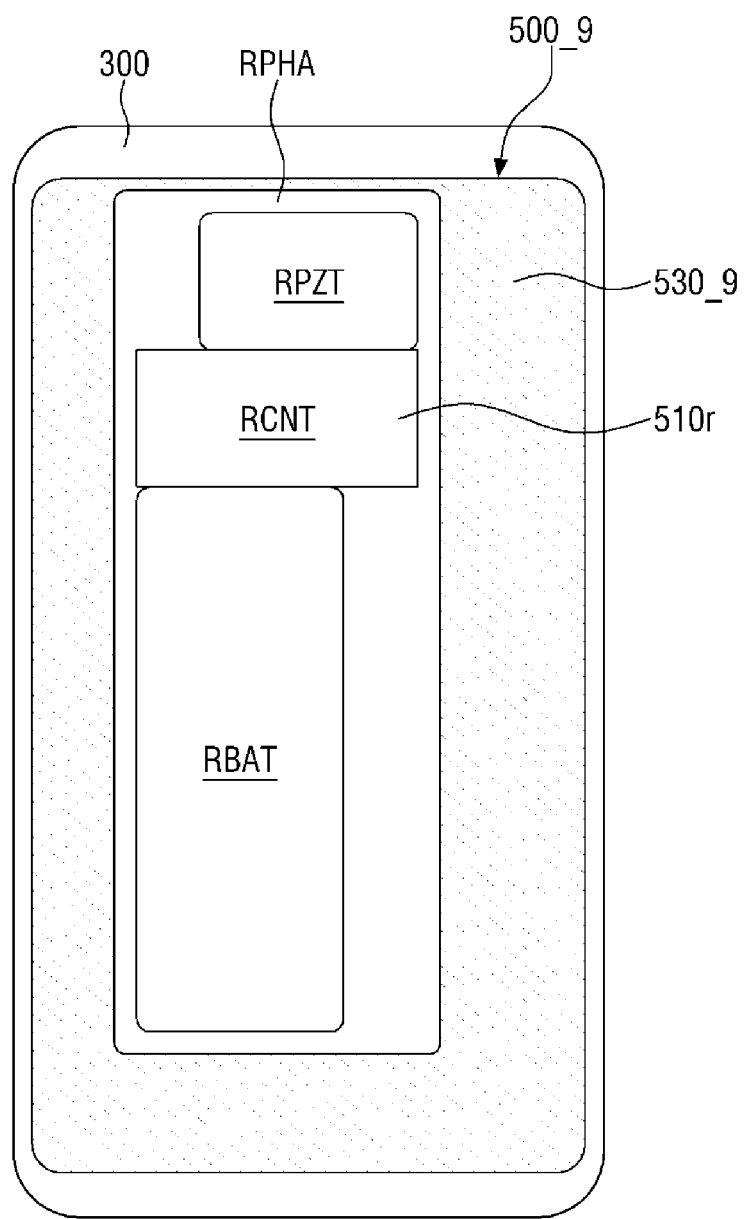

A lower panel sheet 500_9 according to the exemplary embodiment of FIG. 17 exemplifies a case where the peripheral region RPHA where a bottom bonding layer 530_9 is not disposed completely surrounds the region RPZT where the vibration sound device is disposed as well as the connection region RCNT and the region RBAT corresponding to the battery hole in addition to the exemplary embodiment of FIG. 16.

In the case of the exemplary embodiment, since the bottom coupling layer 530_9 completely surrounds the region RPZT where the vibration sound device is disposed, the sufficient echo space may be secured and the impact resistance of the vibration sound device 400 (refer to FIG. 2) may be enhanced in addition to the exemplary embodiment of FIG. 16.

Figure 18:
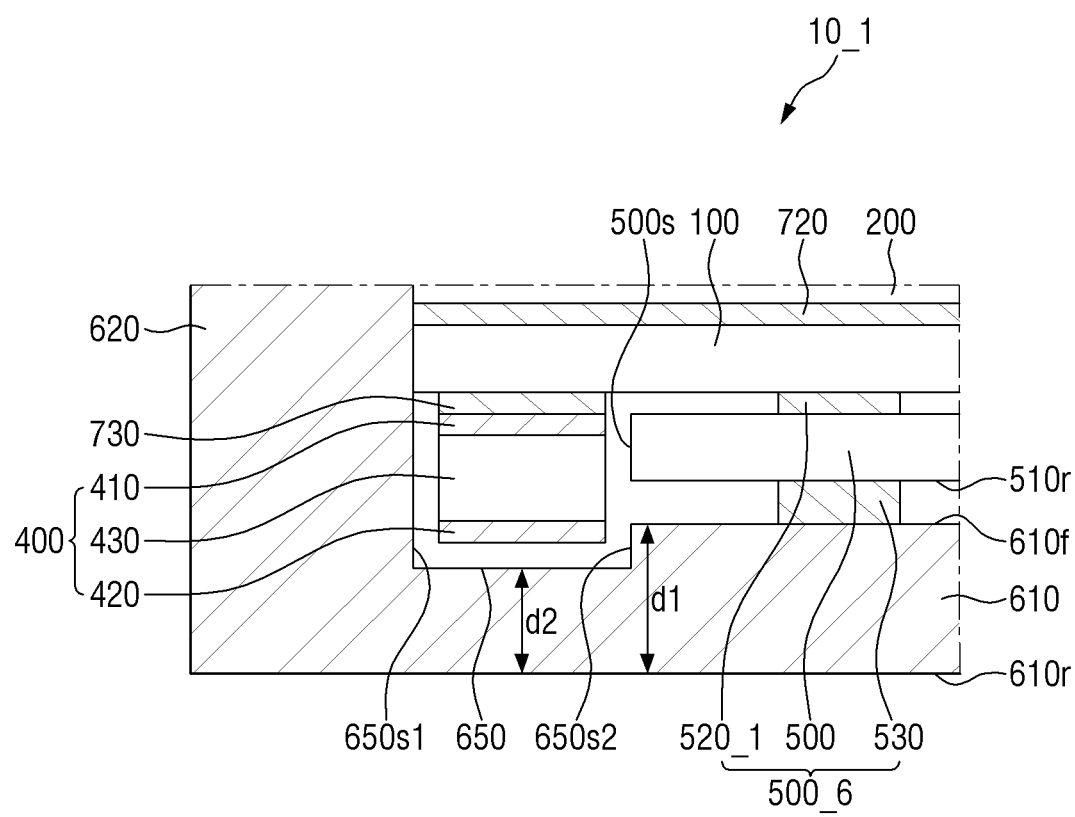
FIG. 18 is a partial cross-sectional view of another exemplary embodiment of a display device.

FIG. 18 is a partial cross-sectional view of a display device according to still yet another exemplary embodiment.

A display device 10_1 according to the exemplary embodiment of FIG. 18 exemplifies that the top coupling layer 520_1 of the lower panel sheet 500_6 may be patterned to provide the echo space. Referring to FIG. 18, the top coupling layer 520_1 may expose at least a part of the upper surface of the lower panel sheet 500_6. The display panel 100 and the lower panel sheet 500_6 may be spaced apart from each other in a part where the top coupling layer 520_1 is not disposed. Empty spaces in which the top coupling layer 520_1 is not disposed may be connected to each other and may further be connected up to the vibration sound device 400 to form the echo space. An arrangement and density of the top coupling layer 520_1 may be the same as those of the bottom coupling layer described in the exemplary embodiments of FIGS. 5 and 9 to 17.

As illustrated in the drawing, when the echo space is also defined in the bottom coupling layer 530, it is possible to secure two echo spaces, thereby enabling more effective sound amplification. The pattern shape of the top coupling layer 520_1 may be the same as the pattern shape of the bottom coupling layer 530, but may be different and combinations of various shapes illustrated in FIGS. 5 and 9 to 17 will be able to be made.

When the top coupling layer 520_1 secures the sufficient echo space, the bottom coupling layer may not be patterned unlike the bottom coupling layer illustrated in the drawing. That is, the bottom coupling layer may cover the entire lower surface of the lower panel sheet 500_6 other than the region corresponding to the battery hole.

Figure 19:
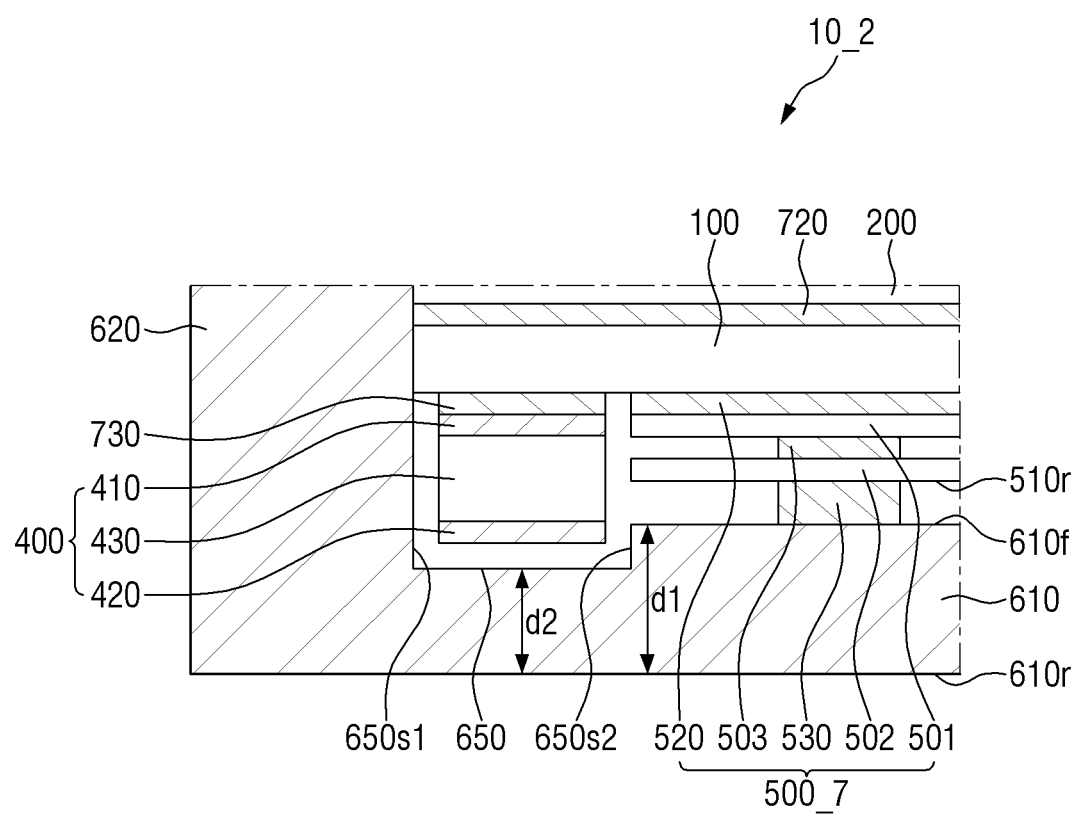
FIG. 19 is a partial cross-sectional view of another exemplary embodiment of a display device.

FIG. 19 is a partial cross-sectional view of a display device according to yet another exemplary embodiment.

A display device 10_2 according to the exemplary embodiment of FIG. 19 exemplifies that a lower panel sheet 500_7 includes a plurality of constituent sheets 501 and 502 coupled by an inter-sheet coupling layer 503 and the inter-sheet coupling layer 503 is patterned to provide the echo space. Referring to FIG. 19, the lower panel sheet 500 includes a first lower panel sheet 501, a second lower panel sheet 502, and the inter-sheet coupling layer 503 that mutually couples the first and second lower panel sheets 501 and 502. The first lower panel sheet 501 disposed on the upper portion may be a buffer sheet and the second lower panel sheet 502 disposed on the lower portion may be a heat radiation sheet, but are not limited thereto.

The inter-sheet coupling layer 503 is disposed between the first lower panel sheet 501 and the second lower panel sheet 502 to couple the first and second lower panel sheets 501 and 502. The inter-sheet coupling layer 503 may have a planar shape of the bottom coupling layer illustrated in FIGS. 5 and 9 to 17. As a result, between the first lower panel sheet 501 and the second lower panel sheet 502, the inter-sheet coupling layer 503 coupling parts of the facing sheets 501 and 502, and a space where the facing sheets 501 and 502 are spaced apart from each other by the inter-sheet coupling layer 503 and the inter-sheet coupling layer 503 is not disposed may be provided, and the separation space may be used as the echo space. As illustrated in the drawing, when the echo space is also defined in the bottom coupling layer 530 and/or the echo space is defined in the top coupling layer 520, two or three echo spaces may be secured, thereby enabling more effective sound amplification.

Figure 20:
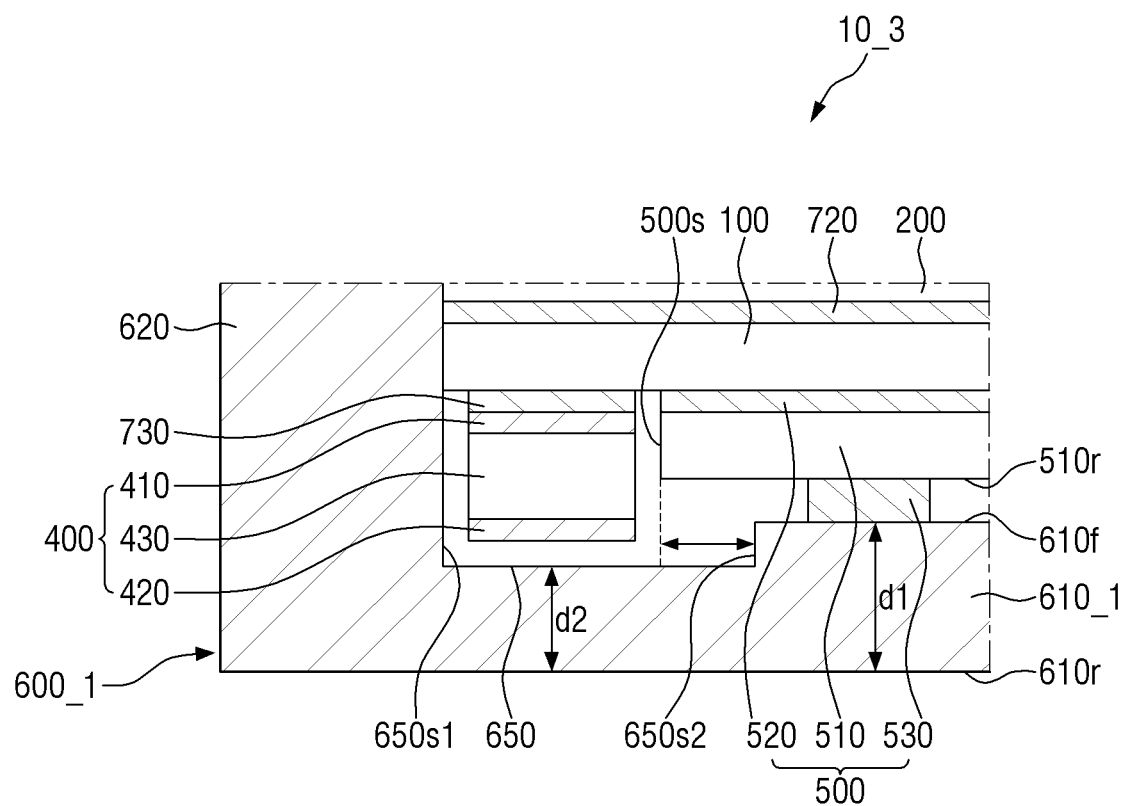
FIG. 20 is a partial cross-sectional view of another exemplary embodiment of a display device.

FIG. 20 is a partial cross-sectional view of a display device according to still yet another exemplary embodiment.

A display device 10_3 according to the exemplary embodiment of FIG. 20 exemplifies that an additional ringing space may be secured according to the shape of a bracket 600_1. Referring to FIG. 20, a side 500s of the lower panel sheet 500 around a concave groove 650 of a bottom portion 610_1 is positioned outside an inner wall 650s2 of the concave groove 650. That is, by making the width of the concave groove 650 relatively wide, the separation space may be secured between the inner wall 650s2 of the concave groove 650 and the vibration sound device 400. The separation space defined as such may be used as the echo space together with the separation space defined between the lower panel sheet 500 and the bracket 600_1 by the pattern shape of the bottom coupling layer 530. Accordingly, more effective sound amplification may be enabled.

Figure 21:
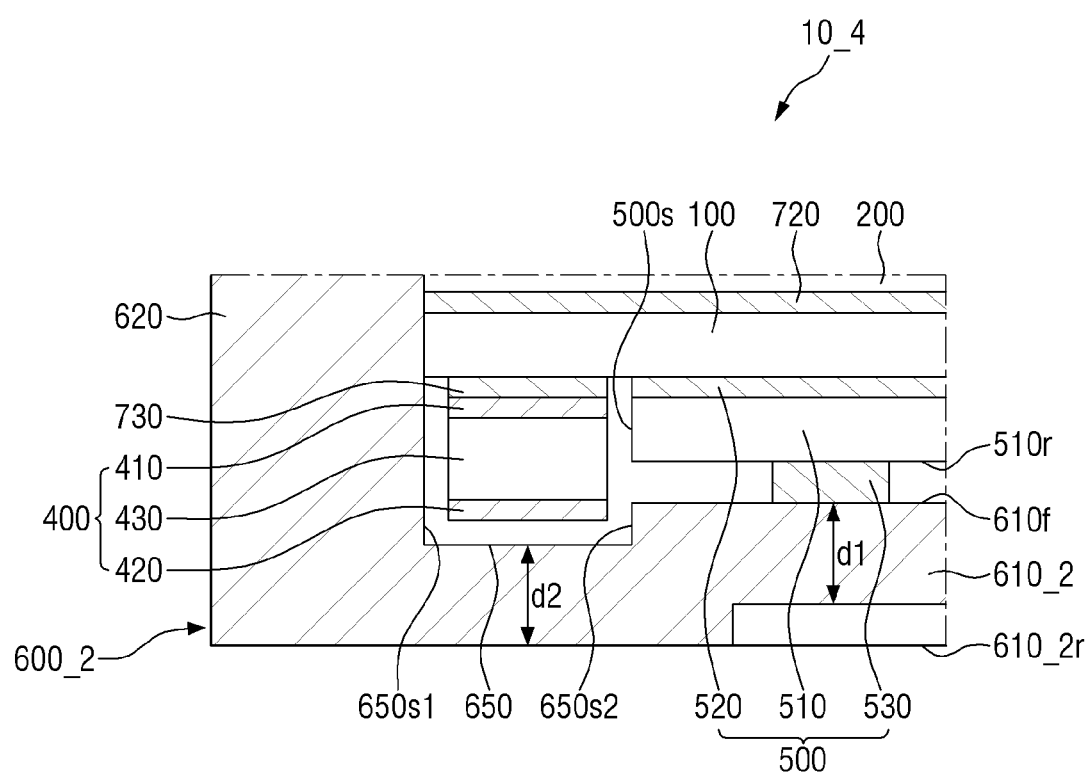
FIG. 21 is a partial cross-sectional view of another exemplary embodiment of a display device.

FIG. 21 is a partial cross-sectional view of a display device according to still yet another exemplary embodiment.

Referring to FIG. 21, a display device 10_4 according to the exemplary embodiment is different from that of the exemplary embodiment of FIG. 5 in that a lower surface 610_2r of a bottom portion 610_2 of a bracket 600_2 is not flat. That is, the lower surface 610_2r of the bottom portion 610_2 of the bracket 600_2 has a reference surface and protrudes downward at a portion where the concave groove 650 is defined. Total thicknesses d1 and d2 of the bottom portion 610_2r of the bracket 600_2 may be uniform regardless of whether the concave groove 650 is defined.

Figure 22:
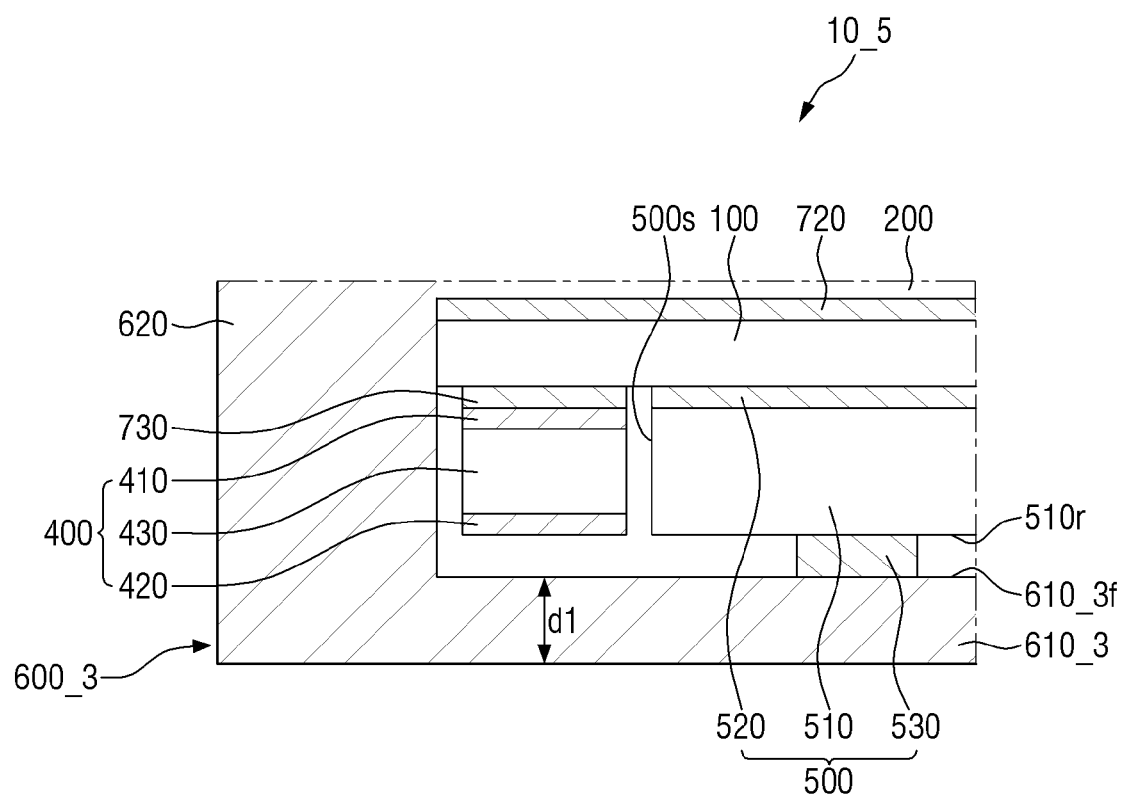
FIG. 22 is a partial cross-sectional view of another exemplary embodiment of a display device.

FIG. 22 is a partial cross-sectional view of a display device according to still yet another exemplary embodiment.

Referring to FIG. 22, in a display device 10_5 according to the exemplary embodiment, it is exemplified that the concave groove is not defined in a bottom portion 610_3 of a bracket 600_3 in the region corresponding to the vibration sound device 400, and an upper surface 610_3f thereof may be flat. The exemplary embodiment of FIG. 22 may be provided in the case of employing the vibration sound device 400 having a small thickness.

Figure 23:
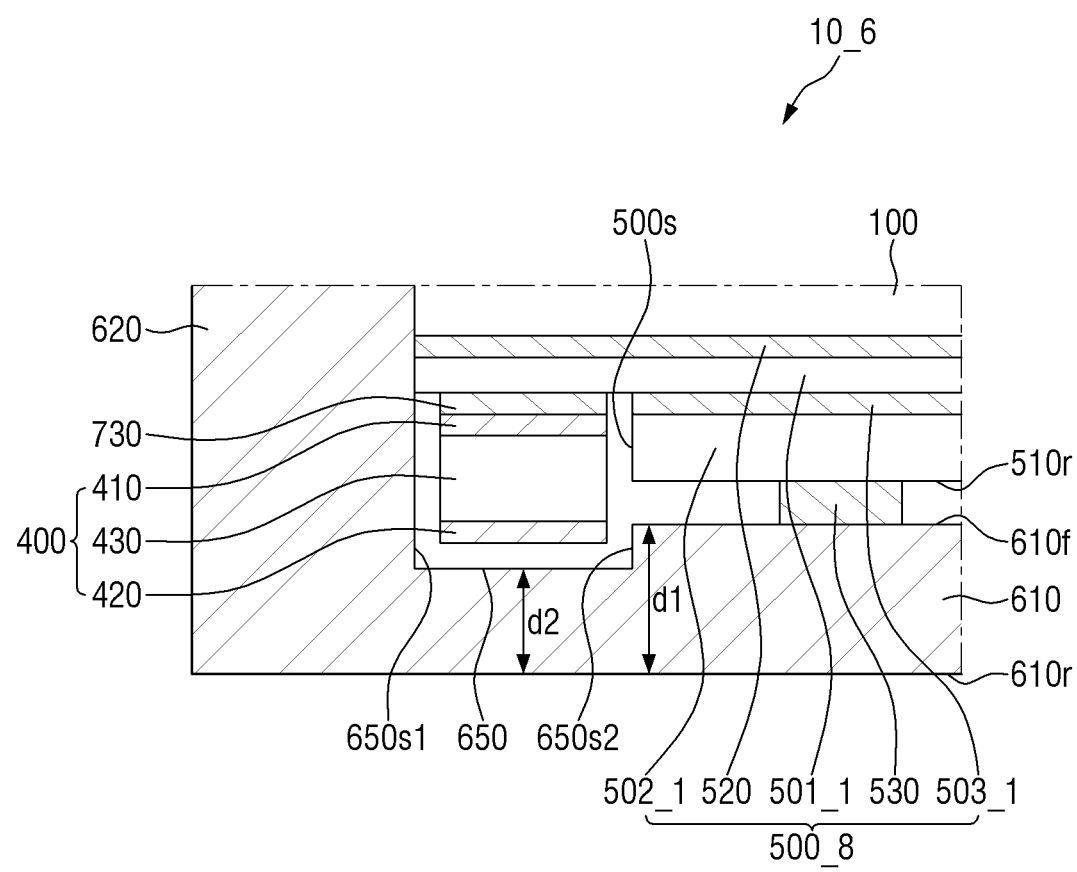
FIG. 23 is a partial cross-sectional view of another exemplary embodiment of a display device.

FIG. 23 is a partial cross-sectional view of a display device according to still yet another exemplary embodiment.

Referring to FIG. 23, in a display device 10_6 according to the exemplary, it is exemplified that that the vibration sound device 400 may overlap some constituent sheets of the lower panel sheet 500_8.

Specifically, a lower panel sheet 500_8 includes a first lower panel sheet 501_1, a second lower panel sheet 502_1, and an inter-sheet coupling layer 503_1 that mutually couples the first and second lower panel sheets 501_1 and 502_1. The first lower panel sheet 501_1 disposed on the upper portion may be the buffer sheet and the second lower panel sheet 502_1 disposed on the lower portion may be the heat radiation sheet, but are not limited thereto.

The first lower panel sheet 501_1 may cover the entire lower surface of the display panel 100. The vibration sound device 400 may be attached to the lower surface of the first lower panel sheet 501_1 through a coupling member 730. The second lower panel sheet 502_1 may not overlap the vibration sound device 400 in a thickness direction (e.g., vertical direction in FIG. 23).

In the case of the exemplary embodiment, the vibration transmitted to the display panel 100 is smaller than that in the exemplary embodiment of FIG. 5 because the vibration sound device 400 is coupled to the display panel 100 through the first lower panel sheet 501_1, but the vibration sound device 400 may be attached to the display panel 100 while being attached to the first lower panel sheet 501_1, thereby simplifying the process.

As described above, according to a display device of an exemplary embodiment, since a display panel having a relatively large area is used as a diaphragm of a speaker, excellent sound and low-frequency output characteristics may be exhibited. In addition, since the display panel itself is used as a diaphragm, it is not necessary to provide a separate speaker, so that the size of the display device may be reduced and a structure may be simplified.

Further, since a ringing space is ensured through a pattern of a coupling layer, sound may be enriched even when a separation space between a vibration sound device and a concave groove of a bracket is not provided or a size of the separation space is not sufficient.

The effects of the invention are not limited by the foregoing, and other various effects are anticipated herein.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:
1. A display device comprising:
   a display panel;
   a vibration sound device disposed below the display panel;
   a lower panel sheet disposed adjacent to the vibration sound device below the display panel and including a functional layer and a bottom adhesive layer disposed on a lower surface of the functional layer; and
   a bracket disposed below the vibration sound device and the lower panel sheet;
   wherein the bottom adhesive layer is adhered with the lower surface of the functional layer and the bracket, and
   wherein the bottom adhesive layer partially exposes the lower surface of the functional layer, a separation space is defined between the bracket and the lower surface of the functional layer where the bottom adhesive layer is exposed, and the separation space is partially connected with the vibration sound device.

2. The display device of claim 1, wherein the bottom adhesive layer includes a plurality of island-type patterns which is spaced apart from each other and is adhered with the functional layer and the bracket.

3. The display device of claim 2, wherein an island-type pattern of the plurality of island-type patterns has a line shape which extends in a predetermined direction.

4. The display device of claim 2, wherein an island-type pattern of the plurality of island-type patterns has a square shape and is regularly arranged in a matrix direction.

5. The display device of claim 2, wherein a density of the plurality of island-type patterns increases as a distance from the vibration sound device increases.

6. The display device of claim 2, wherein the bottom adhesive layer is uniformly disposed throughout the lower surface of the functional layer.

7. The display device of claim 1, wherein a concave groove receiving the vibration sound device and a hole spaced apart from the concave groove are defined in the bracket.

8. The display device of claim 7, wherein the separation space is spatially connected with the hole.

9. The display device of claim 7, wherein the bottom adhesive layer exposes the lower surface of the function layer of a connection region connecting the concave groove and the hole.

10. The display device of claim 1, wherein the lower panel sheet further includes a coupling region where the bottom adhesive layer is disposed and coupled with the bracket and a separation region where the bottom adhesive layer is not disposed and is spaced apart from the bracket.

11. The display device of claim 1, wherein the concave groove receiving the vibration sound device is defined in the bracket, and
a side of the lower panel sheet around the concave groove is aligned with an inner wall of the concave groove or positioned inside the inner wall.

12. The display device of claim 1, wherein the vibration sound device and the lower panel sheet do not overlap each other.

13. The display device of claim 12, wherein the lower panel sheet surrounds the vibration sound device in a plan view.

14. The display device of claim 12, wherein the display panel includes a display area and a non-display area around the display area and the vibration sound device is disposed throughout the non-display area and the display area.

15. The display device of claim 1, wherein the lower panel sheet further includes a top adhesive layer disposed on a top portion of the lower panel sheet and adhered with a lower surface of the display panel.

16. The display device of claim 1, wherein the vibration sound device includes a first electrode, a second electrode, and a vibration material layer positioned between the first electrode and the second electrode and the vibration material layer includes at least one of a piezoelectric body, a piezoelectric film, and an electric active polymer.

17. The display device of claim 16, wherein the vibration sound device is attached to the lower surface of the display panel.

18. The display device of claim 1, wherein the lower panel sheet and the vibration sound device are disposed in a same layer, and
wherein the lower panel sheet and the vibration sound device are disposed below a lower surface of the display panel.

19. The display device of claim 1, wherein the vibration sound device is attached to a lower surface of the display panel, and
wherein the lower surface of the display panel faces the lower panel sheet.

20. A display device comprising:
a display panel;
a vibration sound device disposed below the display panel;
a lower panel sheet disposed adjacent to the vibration sound device below the display panel; and
a bracket disposed below the vibration sound device and the lower panel sheet,
wherein the lower panel sheet is attached to each of the display panel and the bracket,
the lower panel sheet includes an adhesive material pattern which is adhered with portions of members which are adjacent to each other in a predetermined direction perpendicular to a plane of the lower panel sheet and separates remaining portions of the members from each other, and
a space disposed between the bracket and the lower panel sheet in the predetermined direction between the adjacent members spaced by the adhesive material pattern is spatially connected with the vibration sound device.

21. The display device of claim 20, wherein the adhesive material pattern is disposed at a lowermost portion of the lower panel sheet and adhered with an upper surface of the bracket.

22. The display device of claim 20, wherein the adhesive material pattern is disposed at an uppermost portion of the lower panel sheet and adhered with a lower surface of the display panel.

23. The display device of claim 20, wherein the lower panel sheet further includes a first lower panel sheet and a second lower panel sheet disposed below the first lower panel sheet and the adhesive material pattern is interposed between the first lower panel sheet and the second lower panel sheet and couples the first lower panel sheet and the second lower panel sheet with each other.

24. The display device of claim 20, wherein the adhesive material pattern includes a plurality of island-type patterns which is spaced apart from each other.

25. The display device of claim 24, wherein an island-type pattern of the plurality of island-type patterns has a square shape and is regularly arranged in a matrix direction.

26. The display device of claim 24, wherein a density of the plurality of island-type patterns increases as a distance from the vibration sound device increases.

27. The display device of claim 20, wherein an empty space is disposed between the bracket and the vibration sound device in the predetermined direction.

* * * * *